(12) United States Patent
Honda et al.

(10) Patent No.: US 10,216,110 B2
(45) Date of Patent: Feb. 26, 2019

(54) TONER BINDER AND TONER

(71) Applicant: Sanyo Chemical Industries, Ltd., Kyoto-shi (JP)

(72) Inventors: Masaru Honda, Kyoto (JP); Tsuyoshi Izumi, Kyoto (JP); Hiroshi Odajima, Kyoto (JP); Masashi Minaki, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 15/553,306

(22) PCT Filed: Feb. 22, 2016

(86) PCT No.: PCT/JP2016/055009
§ 371 (c)(1),
(2) Date: Aug. 24, 2017

(87) PCT Pub. No.: WO2016/136652
PCT Pub. Date: Sep. 1, 2016

(65) Prior Publication Data
US 2018/0039193 A1    Feb. 8, 2018

(30) Foreign Application Priority Data

Feb. 25, 2015    (JP) ................................. 2015-035320
Jun. 8, 2015    (JP) ................................. 2015-115956
Jun. 22, 2015    (JP) ................................. 2015-124666
Aug. 31, 2015    (JP) ................................. 2015-171015
Aug. 31, 2015    (JP) ................................. 2015-171052

(51) Int. Cl.
| | | |
|---|---|---|
| *G03G 9/08* | (2006.01) | |
| *G03G 9/087* | (2006.01) | |
| *C08G 63/00* | (2006.01) | |
| *C08K 5/29* | (2006.01) | |
| *C08L 67/00* | (2006.01) | |
| *C08G 63/91* | (2006.01) | |

(52) U.S. Cl.
CPC ......... *G03G 9/08755* (2013.01); *C08G 63/00* (2013.01); *C08G 63/91* (2013.01); *C08K 5/29* (2013.01); *C08L 67/00* (2013.01); *G03G 9/087* (2013.01); *G03G 9/08786* (2013.01); *G03G 9/08795* (2013.01); *G03G 9/08797* (2013.01)

(58) Field of Classification Search
CPC ................................................ G03G 9/08755
USPC ......................................................... 430/109.4
See application file for complete search history.

(56) References Cited

U.S. PATENT DOCUMENTS

| | | | |
|---|---|---|---|
| 2007/0281235 A1 | 12/2007 | Ono et al. | |
| 2008/0261133 A1 | 10/2008 | Maehata et al. | |
| 2013/0029264 A1 | 1/2013 | Matsuoka et al. | |
| 2017/0017175 A1* | 1/2017 | Yamada | ............... G03G 9/0806 |

FOREIGN PATENT DOCUMENTS

| | | |
|---|---|---|
| EP | 1698944 A1 | 9/2006 |
| EP | 2511319 A1 | 10/2012 |
| JP | 57-109825 A | 7/1982 |
| JP | 63-056659 A | 3/1988 |
| JP | 01-154068 A | 6/1989 |
| JP | 02-166464 A | 6/1990 |
| JP | 02-308175 A | 12/1990 |
| JP | 04-12367 A | 1/1992 |
| JP | 04-211272 A | 8/1992 |
| JP | 11-282203 A | 10/1999 |
| JP | 11-305481 A | 11/1999 |
| JP | 2001-265056 A | 9/2001 |
| JP | 2001-330994 A | 11/2001 |
| JP | 2004-258627 A | 9/2004 |
| JP | 2005-156824 A | 6/2005 |
| JP | 2006-154686 A | 6/2006 |
| JP | 2007-147914 A | 6/2007 |
| JP | 2007-212753 A | 8/2007 |
| JP | 2007-238954 A | 9/2007 |
| JP | 2008-233396 A | 10/2008 |
| JP | 2008-233531 A | 10/2008 |
| JP | 2008-268538 A | 11/2008 |
| JP | 2009-175755 A | 8/2009 |

(Continued)

OTHER PUBLICATIONS

Office Action dated Aug. 7, 2017. issued for the Japanese patent application No. 2016-030795 and English translation thereof.
International Search Report dated Apr. 19, 2016, issued for PCT/JP2016/055009.
Extended European Search Report issued in corresponding European Patent Application No. EP 18755398.1, dated Jul. 27, 2018.

*Primary Examiner* — Mark A Chapman
(74) *Attorney, Agent, or Firm* — Locke Lord LLP; James E. Armstrong, IV; Nicholas J. DiCeglie, Jr.

(57) ABSTRACT

Provided is a toner binder which attains all of low-temperature fixing properties, gloss, and hot offset resistance and gives a toner that satisfies the flowability, high-temperature storability, charge stability, pulverizability, image strength, flex cracking resistance, and document anti-offset properties. The present invention is a toner binder which comprises a polyester resins and has a surfactant content of 100 ppm or less and in which the THF-insoluble components and the THF-soluble components respectively have a storage modulus (Pa) at 150° C., $G'_{x150}$, and the storage modulus (Pa) at 150° C., $G'_{y150}$, which satisfy the following relationships (1) and (2).

$$G'_{x150} \geq 10{,}000 \quad (1)$$

$$G'_{x150}/G'_{y150} \geq 500 \quad (2)$$

13 Claims, No Drawings

(56) References Cited

FOREIGN PATENT DOCUMENTS

| | | |
|---|---|---|
| JP | 2011-028170 A | 2/2011 |
| JP | 2011-175257 A | 9/2011 |
| JP | 2012-177785 A | 9/2012 |
| JP | 5075631 B | 11/2012 |
| JP | 2015-22292 A | 2/2015 |
| JP | 2016-157119 A | 9/2016 |
| WO | 2005/057293 A1 | 6/2005 |

\* cited by examiner

TONER BINDER AND TONER

TECHNICAL FIELD

The present invention relates to a toner composition and a toner binder to be used for the development of electrostatic images or magnetic latent images in an electrophotographic process, an electrostatic recording process, an electrostatic printing process, etc.

BACKGROUND ART

In recent years, the demand for electrophotographic devices, such as copying machines and laser printers, has dramatically increased with development of the electrophotographic system and the requirements for their performance have become sophisticated. Generally, in an electrophotographic process, an electrostatic image (a latent image) is formed on a photosensitive material and then the latent image is developed using a toner, and thus a toner image is formed. The toner image is transferred to a recording medium such as paper and then is fixed by such means as heating.

In order to pass through such a process without any problems, the toner is first required to hold a stable amount of charge, and is secondly required to have good fixing property to paper. Moreover, since a device has a heater in its fixing part, the temperature rises in the device, and therefore, the toner is required not to suffer from blocking within a device.

Moreover, in addition to acceleration of size reduction, increase in speed, and improvement in image quality of the electrophotographic devices, improvement of a toner in low-temperature fixing property has strongly been demanded from the viewpoint of energy saving, namely, reducing energy consumption in the fixing step. When a toner image is fixed by a hot roll fixation system, a hot roll and a toner in a molten state come into contact with each other directly at the time of fixation. At this time, since there occurs a so-called "offset phenomenon" in which the toner transferred onto the hot roll stains the paper that is fed next, offset resistance is necessarily required. Therefore, it is necessary to develop low-temperature fixing property while maintaining offset resistance, and a toner having a wider working range, e.g., a fixing temperature range of 50° C. or more, has increasingly been required.

Toner binders have a great influence on toner properties like those mentioned above. Although there are known polystyrene resin, styrene-acrylic resin, polyester resin, epoxy resin, polyurethane resin, polyamide resin, etc., the polyester resin has recently attracted particular attention because it is easy to balance storage property and fixing property.

Conventionally, as a method for expanding the fixing temperature range of polyester resin, there has been studied a method using a non-linear polyester resin having a three-dimensional crosslinked structure prepared using tri- or more functional monomers (see, for example, Patent Document 1). The non-linear polyester resin disclosed in Patent Document 1 is superior in hot offset resistance and can develop a high maximum fixing temperature; however, it is not sufficient with respect to the level of low-temperature fixing property.

Then, as means for improving the low-temperature fixing property, there has been studied using a linear polyester resin composed of a divalent carboxylic compound and a dihydric alcohol compound (see, for example, examples in Patent Document 2). Although a linear polyester resin having no three-dimensional structure is superior in low-temperature fixing property, it is problematic in that a wide fixing temperature range cannot be secured because of its poor hot offset resistance.

Patent Document 3 proposes a toner using a product produced by making a polyester resin having unsaturated double bonds undergo a crosslinking reaction with a radical reaction initiator. However, even if this method can similarly prevent the offset phenomenon at high temperatures to some extent, it becomes difficult to attain low-temperature fixation because the fixation lower limit temperature is also raised simultaneously, and therefore, that method has not sufficiently met the demand for increasing the speed or saving energy, yet.

Moreover, toners using a reaction product of an isocyanate with a mixture of a resin for producing a macromolecules and a polyester resin have been proposed (Patent Documents 4 to 11). However, even if this method can similarly prevent the offset phenomenon at high temperatures to some extent, it becomes difficult to attain low-temperature fixation because the fixation lower limit temperature is also raised simultaneously and moreover, the uniformity of resin is impaired and the heat resistant storage property is also deteriorated, and therefore, that method has not sufficiently met the demand for increasing the speed or saving energy, yet.

On the other hand, Patent Document 12 has proposed a chemical toner produced by a suspension polymerization method in which granulation is performed in a water phase. This method is a method of obtaining toner particles by adding monomers, a polymerization initiator, a colorant, a mold release agent, etc. to a water phase containing a dispersion stabilizer under stirring to form oil droplets, and then raising the temperature to perform a polymerization reaction. According to this suspension polymerization method, it is possible to simultaneously improve low-temperature fixing property, hot offset resistance, and heat resistant storage property by successfully reducing the particle size of toner particles and homogenizing resin, but a surfactant (a dispersion stabilizer) must be used and there is a problem that electrostatic property is deteriorated due to remaining of the surfactant.

As described above, there have not yet been present toner binders and toners that realize all of low-temperature fixing property, glossiness, and hot offset resistance, and satisfy the flowability, heat resistant storage property, electrostatic stability, grindability, image strength, folding resistance, and document offset property of a toner.

PRIOR ART DOCUMENTS

Patent Documents

Patent Document 1: JP-A-57-109825
Patent Document 2: JP-A-4-12367
Patent Document 3: Publication of Japanese Patent No. 5075631
Patent Document 4: JP-A-63-56659
Patent Document 5: JP-A-1-154068
Patent Document 6: JP-A-2-166464
Patent Document 7: JP-A-2-308175
Patent Document 8: JP-A-4-211272
Patent Document 9: JP-A-11-282203
Patent Document 10: JP-A-11-305481
Patent Document 11: JP-A-2004-258627
Patent Document 12: JP-A-2007-212753

SUMMARY OF THE INVENTION

Problems to be Solved by the Invention

An object of the present invention is to provide a toner binder and a toner that realize a low-temperature fixing property, glossiness, and hot offset resistance and satisfy the flowability, heat resistant storage property, electrostatic stability, grindability, image strength, folding resistance, and document offset property of a toner.

Solutions to the Problems

In order to solve these problems, the present inventors studied intensively, and thus have achieved the present invention.

Namely, the present invention is directed to a toner binder comprising a polyester resin, wherein the toner binder satisfies Formula (1) and Formula (2) given below and has a content of a surfactant of 100 ppm or less, and a toner including the toner binder and a colorant:

$$G'_{x150} \geq 10{,}000 \tag{1}$$

$$G'_{x150}/G'_{y150} \geq 500 \tag{2}$$

wherein $G'_{x150}$ represents the storage modulus (unit: Pa) at 150° C. for the tetrahydrofuran (hereinafter, THF)-insoluble component of the toner binder and $G'_{y150}$ represents the storage modulus (unit: Pa) at 150° C. of the THF-soluble component of the toner binder.

Advantages of the Invention

The present invention has made it possible to provide a toner binder and a toner that realize a low-temperature fixing property, glossiness, and hot offset resistance and are superior in the flowability, heat resistant storage property, electrostatic stability, grindability, image strength, folding resistance, and document offset property of a toner.

MODE FOR CARRYING OUT THE INVENTION

The toner binder of the present invention includes a polyester resin, and no surfactant is used during the production thereof, so that substantially no surfactant is added. For this reason, the content of a surfactant is 100 ppm or less, if contained. In addition, the toner binder of the present invention satisfies the following Formula (1) and Formula (2).

$$G'_{x150} \geq 10{,}000 \tag{1}$$

$$G'_{x150}/G'_{y150} \geq 500 \tag{2}$$

In Formula (1) and Formula (2), $G'_{x150}$ represents the storage modulus (unit: Pa) at 150° C. of a THF-insoluble component at the time when trying to dissolve the toner binder in THF. $G'_{y150}$ represents the storage modulus (unit: Pa) at 150° C. of a THF-soluble component.

The toner binder of the present invention is described in order below.

Although a polyester resin is used for the toner binder of the present invention, the composition of the resin is not particularly limited if Formula (1) and Formula (2) regarding the storage moduli of the THF-insoluble component and the THF-soluble component described below are satisfied.

The polyester resin may be a single species or alternatively may be a mixture of two or more polyester resins, and a combination of a non-linear polyester resin (A) and a linear polyester resin (B) is preferable in that Formula (1) and Formula (2) are easily satisfied.

The polyester resin in the present invention is obtained by polycondensing one or more saturated carboxylic acid components (x) with one or more alcohol components (y). Moreover, it is also permitted to perform the polycondensation using one or more unsaturated carboxylic acid components (z) as a raw material in addition to (x) and (y).

Examples of the saturated carboxylic acid components (x) include alkane dicarboxylic acids having 2 to 50 carbon atoms (oxalic acid, malonic acid, succinic acid, adipic acid, lepargylic acid, sebacic acid, etc.); aromatic dicarboxylic acids having 8 to 36 carbon atoms (phthalic acid, isophthalic acid, terephthalic acid, naphthalene dicarboxylic acid, etc.), aromatic polycarboxylic acids having 9 to 20 carbon atoms (trimellitic acid, pyromellitic acid, etc.), aliphatic tricarboxylic acids having 6 to 36 carbon atoms (hexane tricarboxylic acid, etc.).

As the saturated carboxylic acid component (x), acid anhydrides or lower alkyl (having 1 to 4 carbon atoms) esters (methyl ester, ethyl ester, isopropyl ester, etc.) of those carboxylic acids may be used, or alternatively, they may be used together with those carboxylic acids.

Of those saturated carboxylic acid components (x), preferred from the viewpoint of ensuring both of low-temperature fixing property and hot offset resistance are the alkane dicarboxylic acids having 2 to 50 carbon atoms, the aromatic dicarboxylic acids having 8 to 20 carbon atoms, and aromatic polycarboxylic acids having 9 to 20 carbon atom.

More preferred from the viewpoint of storage stability are adipic acid, alkenyl succinic acids having 16 to 50 carbon atoms, terephthalic acid, isophthalic acid, trimellitic acid, pyromellitic acid, and combinations thereof.

Particularly preferred are adipic acid, terephthalic acid, trimellitic acid, and combinations thereof. The anhydrides and lower alkyl esters of these acids are also preferred.

Examples of the alcohol component (y) include monools (y1), diols (y2), and tri- to octa-valent or more valent polyols (Y3).

Examples of the monools (y1) include alkanols having 1 to 30 carbon atoms (methanol, ethanol, isopropanol, dodecyl alcohol, myristyl alcohol, cetyl alcohol, stearyl alcohol, behenyl alcohol, etc.).

Preferable of such monools are alkanols having 8 to 24 carbon atoms, and more preferable are dodecyl alcohol, myristyl alcohol, stearyl alcohol, behenyl alcohol, and combinations thereof.

Examples of the diols (y2) include:
(y21): alkylene glycols having 2 to 36 carbon atoms (ethylene glycol, 1,2-propylene glycol, 1,3-propylene glycol, 1,4-butanediol, neopentyl glycol, 1,6-hexanediol, 1,9-nonanediol, 1,10-decanediol, 1,12-dodecanediol, etc.);
(y22): alkylene ether glycols having 4 to 36 carbon atoms (diethylene glycol, triethylene glycol, dipropylene glycol, polyethylene glycol, polypropylene glycol, polytetramethylene ether glycol, etc.);
(y23): alicyclic diols having 6 to 36 carbon atoms (1,4-cyclohexanedimethanol, hydrogenated bisphenol A, etc.);
(y24): (poly)oxyalkylene [the alkylene group has 2 to 4 carbon atoms (oxyethylene, oxypropylene, etc.); the same applies to the polyoxyalkylene mentioned below] ethers [the number of oxyalkylene units (hereinafter abbreviated as AO units) is 1 to 30] of the above-mentioned alicyclic diols; and
(y25): dihydric phenols [dihydric monocyclic phenol (e.g., hydroquinone)] and polyoxyalkylene ethers (the number of AO units: 2 to 30) of bisphenol.

Of these diols (y2), polyoxyalkylene ethers of bisphenols are preferred from the viewpoint of low-temperature fixing property and heat resistant storage property.

Polyoxyalkylene ethers of bisphenols are usually obtained by adding alkylene oxides (hereinafter "alkylene oxide" may also be abbreviated as AO) to bisphenols. Examples of the bisphenols include those represented by the following formula (I):

OH—Ar—X—Ar—OH  (I)

wherein X represent an alkylene group having 1 to 3 carbon atoms, —$SO_2$—, —O—, —S—, or a direct bond; and two Ar are the same and represent phenylene groups optionally substituted with a halogen atom or an alkyl group having 1 to 30 carbon atoms.

Specific examples of the bisphenols include bisphenol A, bisphenol F, bisphenol B, bisphenol AD, bisphenol S, trichlorobisphenol A, tetrachlorobisphenol A, dibromobisphenol F, 2-methylbisphenol A, 2,6-dimethylbisphenol A, and 2,2'-diethylbisphenol F, and these may be used in combination.

As the alkylene oxides to be added to such bisphenols, alkylene oxides having 2 to 4 carbon atoms are preferable, and specific examples thereof include ethylene oxide (this may hereinafter be abbreviated as EO), propylene oxide (this may hereinafter be abbreviated as PO), 1,2-, 2,3-, 1,3- or iso-butylene oxide, tetrahydrofuran, and combinations thereof.

Preferred of these are EO and/or PO. The number of moles of AO added is preferably 2 to 30 moles, and more preferably 2 to 10 moles.

Of polyoxyalkylene ethers of bisphenols, preferred from the viewpoint of the fixing property of a toner are EO and/or PO adducts of bisphenol A (average number of added moles: 2 to 4, especially, 2 to 3).

Examples of the tri- to octa- or more valent polyols (y3) include the following (y31) to (y35):
tri- to octa- or more valent aliphatic polyhydric alcohols having 3 to 36 carbon atoms (y31) (alkane polyols and intramolecular or intermolecular dehydrated products thereof): e.g., glycerol, trimethylolethane, trimethylolpropane, pentaerythritol, sorbitol, sorbitan, polyglycerol, and dipentaerythritol;
saccharides and derivatives thereof (y32): e.g., sucrose and methyl glucoside;
(poly)oxyalkylene ethers (the number of AO units: 1 to 30) of the above-mentioned aliphatic polyhydric alcohols (y33);
polyoxyalkylene ethers (the number of AO units: 2 to 30) of trisphenols (trisphenol PA, etc.) (y34); and
polyoxyalkylene ethers (the number of AO units: 2 to 30) of novolac resins (phenol novolac, cresol novolac, etc.; average degree of polymerization: 3 to 60) (y35).

Of the alcohol components (y) above, preferred from the viewpoint of simultaneous improvement in low-temperature fixing property and hot offset resistance are the alkylene glycols having 2 to 12 carbon atoms (y21), the polyoxyalkylene ethers (the number of AO units: 2 to 30) of bisphenols (y25), the tri- to octa- or more valent aliphatic polyhydric alcohols having 3 to 36 carbon atoms (y31), and the polyoxyalkylene ethers (the number of AO units: 2 to 30) of novolac resins (y35).

More preferred from the viewpoint of storage stability are alkylene glycols having 2 to 10 carbon atoms, polyoxyalkylene ethers (the number of AO units: 2 to 5) of bisphenols, and polyoxyalkylene ethers (the number of AO units: 2 to 30) of novolac resins.

Particularly preferred are alkylene glycols having 2 to 6 carbon atoms and polyoxyalkylene ethers (the number of AO units: 2 to 5) of bisphenol A, and most preferred are ethylene glycol, propylene glycol, and polyoxyalkylene ethers (the number of AO units: 2 to 3) of bisphenol A.

The polyester resin in the present invention may be prepared by polycondensing an unsaturated carboxylic acid component (z) as a raw material in addition to one or more saturated carboxylic acid components (x) and one or more alcohol components (y).

Examples of such an unsaturated carboxylic acid component (z) include unsaturated monocarboxylic acids (z1), unsaturated dicarboxylic acids (z2), and anhydrides and lower alkyl esters of these acids.

Examples of the unsaturated monocarboxylic acid (z1) include unsaturated monocarboxylic acids having 2 to 30 carbon atoms and specifically include acrylic acid, methacrylic acid, 2-butynoic acid, crotonic acid, isocrotonic acid, and 3-butenoic acid.

Examples of the unsaturated dicarboxylic acid (z2) include alkene dicarboxylic acids having 4 to 50 carbon atoms and specifically include alkenylsuccinic acids such as dodecenylsuccinic acid, maleic acid, fumaric acid, citraconic acid, mesaconic acid, itaconic acid, glutaconic acid, etc.), and vinyl polymers of unsaturated carboxylic acids [number average molecular weight (hereinafter represented by Mn, measured by gel permeation chromatography (GPC)): 450 to 10,000] (α-olefin/maleic acid copolymers, etc.

Of the unsaturated carboxylic acids (z), preferred from the viewpoint of simultaneous improvement in low-temperature fixing property and hot offset resistance are acrylic acid, methacrylic acid, alkenylsuccinic acids such as dodecenylsuccinic acid, maleic acid, and fumaric acid. More preferred are acrylic acid, methacrylic acid, maleic acid, fumaric acid, and combinations thereof. Anhydrides and lower alkyl esters of these acids are also preferred.

As to the polyester resin of the toner binder of the present invention, only one species thereof may be used, or alternatively, mixtures of two or more polyester resins may be employed.

Mixtures of two or more polyester resins are preferable in that it is easy to design polyester resin that satisfies the above-mentioned Formula (1) and Formula (2) regarding the storage moduli of a THF-insoluble component and a THF-soluble component.

Moreover, from the viewpoint of a composition design that satisfies Formula (1) and Formula (2), a combination of a non-linear polyester resin (A) and a linear polyester resin (B) is preferred.

This is because THF-insoluble components are generally non-linear polyester resins in many cases and THF-soluble components are generally linear polyester resins in many cases.

Hereafter, a description is made to the non-linear polyester resin (A) first, and then a description is made to the linear polyester resin (B).

The non-linear polyester resin (A) as referred to herein is a polyester resin having branches (cross-linking points) in the main chain.

Specifically, it is a polyester resin produced by performing a crosslinking reaction, and the type of the crosslinking reaction is not particularly limited, and examples thereof include a reaction including introducing unsaturated double bonds into the main chain or side chains of a polyester resin and reacting the unsaturated double bonds by a radical addition reaction, a cationic addition reaction, an anionic addition reaction, or the like to form intermolecular carbon-carbon bonds.

Moreover, there can also be mentioned reactions of forming ester linkages via a condensation reaction of tri- to hexa- or more valent polycarboxylic acids of the saturated carboxylic acid components (x) with tri- to hexa- or more valent polyols (y3) in producing a polyester resin.

Furthermore, there can also be mentioned polyaddition reactions of polyester resins with compounds having multiple epoxy groups, multiple isocyanate groups, multiple carbodiimide groups, multiple aziridine groups, or multiple oxazoline groups.

The content of the THF-insoluble component of the non-linear polyester resin (A) is preferably 50% by weight or more, more preferably 55% by weight or more, and particularly preferably 60% by weight or more.

If the content of the THF-insoluble component is 50% by weight or more, heat resistant storage property and hot offset resistance become good.

The method of the crosslinking reaction in producing the non-linear polyester resin (A) is not particularly limited, and the following methods (1) and (2) are mentioned and can arbitrarily be chosen.

(1) A method of producing a non-linear polyester resin (A) by simultaneously performing polymerization of a polyester resin and a crosslinking reaction using some trifunctional components.

(2) A method of producing non-linear polyester resins (A1) to (A3) by once obtaining a polyester resin (a) by polymerization and then further performing a crosslinking reaction.

In the case of the production method (1), it is essential to use in combination at least one of a tri- to hexa- or more valent polycarboxylic acid of the saturated carboxylic acid components (x) and tri- to hexa- or more valent polyol (y3).

On the other hand, in the case of the production method (2), it is preferable to use as the polyester resin (a) a polyester resin (a1) having active hydrogen at an end of the main chain or a polyester resin (a2) prepared using an alcohol component (y) and an unsaturated carboxylic acid component (z) as constituent raw materials, and further make the polyester resin undergo a crosslinking reaction.

Of these, the method (2) of obtaining a non-linear polyester resin by once polymerizing a polyester resin (a) and then making the polyester resin (a) undergo a crosslinking reaction is preferable in that the crosslinking reaction occurs effectively and good hot offset resistance and good heat resistant storage property of a toner are attained.

Examples of the above-mentioned method (2) include the following methods (2-1) to (2-3).

(2-1) A method of obtaining a modified non-linear polyester resin (A1) by mixing and reacting a polyester resin (a1) having active hydrogen at an end of the main chain of a polyester resin with an extender (D).

(2-2) A method of obtaining a modified non-linear polyester resin (A2) by chemically bonding a polyester resin (a2) prepared from an alcohol component (y) and an unsaturated carboxylic acid component (z).

(2-3) A method of obtaining a modified non-linear polyester resin (A3) by chemically bonding a polyester resin (a2) prepared from an alcohol component (y) and an unsaturated carboxylic acid component (z), with a compound (b) having a radical reactive group and having a number average molecular weight of 1,000 or less.

For example, when producing a non-linear polyester resin (A) by the method (2) and causing a crosslinking reaction to form carbon-carbon bonds between molecules by a radical addition reaction, it is recommended to perform a polycondensation reaction using a polyester resin (a2) prepared from an alcohol component (y) and an unsaturated carboxylic acid component (z) or using an alcohol compound having an unsaturated double bond in order to introduce an unsaturated double bond into the main chain or a side chain of a polyester resin, and thus incorporate such a compound as a constituent into a polyester resin (a).

Hereafter, the method (2-1) is described, and then the methods (2-2) and (2-3) are described.

The polyester resin (a1) which undergoes a crosslinking reaction with the extender (D) in the method (2-1) is a polyester resin having active hydrogen at an end of the main chain, and examples of a functional group containing active hydrogen include a hydroxyl group, a carboxyl group, and an amino group. Preferred is a hydroxyl group.

The hydroxy value of the polyester resin (a1) is preferably 10 to 80 mgKOH/g, more preferably 20 to 60 mgKOH/g, and particularly preferably 30 to 40 mgKOH/g. If the hydroxy value is 80 mgKOH/g or less, low-temperature fixing property and glossiness when used as a toner are more improved.

The peak molecular weight in gel permeation chromatography (GPC) of the polyester resin (a1) is preferably less than 14,000, more preferably less than 12,000, and most preferably, the peak molecular weight is 3000 to 11,000.

The peak molecular weight (this may hereinafter be abbreviated as Mp) as referred to herein is a molecular weight determined from a peak maximum value of a molecular weight distribution chart, and said molecular weight distribution was calculated from the relationship between the counted number and the logarithmic value of a calibration curve produced using standard polystyrene samples. Since the number of peak (s) that exists in the chart is not necessarily one, when there are a plurality of peaks, the peak molecular weight is determined from the peak that exhibits the greatest value of the peak values.

In the present invention, the peak molecular weight, the number average molecular weight (this may hereinafter be referred to as Mn), and the weight average molecular weight (this may hereinafter be referred to as Mw) of a resin, such as a polyester resin, can be measured under the following conditions using a GPC.

Apparatus (one example): HLC-8120 manufactured by Tosoh Corporation

Column (one example): two of TSK GEL GMH6 [manufactured by Tosoh Corporation]

Measurement temperature: 40° C.

Sample solution: 0.25% by weight THF solution

Solution injection amount: 100 μl

Detecting device: refractive index detector

Standard substance: standard polystyrenes produced by Tosoh Corporation (TSK standard POLYSTYRENE) 12 points (molecular weight: 500 1,050 2,800 5,970 9,100 18,100 37,900 96,400 190,000 355,000 1,090,000 and 2,890,000)

In the measurement of a molecular weight, there is used as a sample solution a filtrate prepared by dissolving a polyester resin or the like in THF in such a manner that a concentration of 0.25% by weight is achieved, and then filtering insolubles away with a glass filter.

The glass transition temperature (Tg) of the polyester resin (a1) is preferably −35° C. to 50° C., and more preferably −30° C. to 45° C. If Tg is 50° C. or lower, the low-temperature fixing property is good, whereas if Tg is −35° C. or higher, the heat resistant storage property is good.

The glass transition temperature (Tg) can be measured by the method provided for in ASTM D3418-82 (the DSC method) using DSC20, SSC/580 manufactured by Seiko Instruments Inc., for example.

From the viewpoint of electrostatic stability, the acid value of the polyester resin (a1) is preferably 0 to 20 mgKOH/g, more preferably 0 to 10 mgKOH/g, and particularly preferably 0 to 5 mgKOH/g.

The acid value and the hydroxy value of a polyester resin can be measured by the methods provided for in JIS K0070 (1992 edition).

The extender (D) is not limited with respect to its type as long as it can cause the above-mentioned crosslinking reaction.

For example, when a crosslinking reaction is carried out by the polyaddition reaction of the method of (2), the extender (D) is preferably a polyisocyanate compound (D1) because good low-temperature fixing property, good offset resistance, and good heat resistant storage property are attained.

For example, in the case of a crosslinking reaction in which carbon-carbon bonds are formed between molecules via the radical addition reaction of the method of (2), a radical reaction initiator may be or may not be used, and the extender (D) is preferable as a radical reaction initiator (D2) especially for effectively causing a crosslinking reaction.

Examples of the polyisocyanate compound (D1) include a divalent diisocyanate compound (D11) and tri- to octa-valent polyisocyanate compounds (D12).

Examples of the divalent diisocyanate compound (D11) include aliphatic diisocyanate compounds, alicyclic diisocyanates, and aromatic diisocyanate compounds.

Examples of the aliphatic diisocyanate compounds include trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2,4,4-trimethylhexamethylene diisocyanate.

Examples of the alicyclic diisocyanate compounds include 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, and hydrogenated tetramethylxylylene diisocyanate.

Examples of the aromatic diisocyanate compounds include phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, and xylylene diisocyanate.

Of the divalent diisocyanate compounds (D11), preferred are aromatic diisocyanates having 6 to 15 carbon atoms, aliphatic diisocyanates having 4 to 12 carbon atoms, and alicyclic diisocyanates having 4 to 15 carbon atoms, and particularly preferred are TDI, MDI, HDI, hydrogenated MDI, and IPDI.

Tri- to octa-valent polyisocyanate compounds (D12) are not particularly limited as long as they are compounds having 3 to 8 isocyanate groups, and examples thereof include compounds containing chemical structures of triisocyanate, tetraisocyanate, isocyanurate, and biuret.

Examples of the triisocyanate compounds include compounds represented by the following a to i:

[Chemical Formula 1]

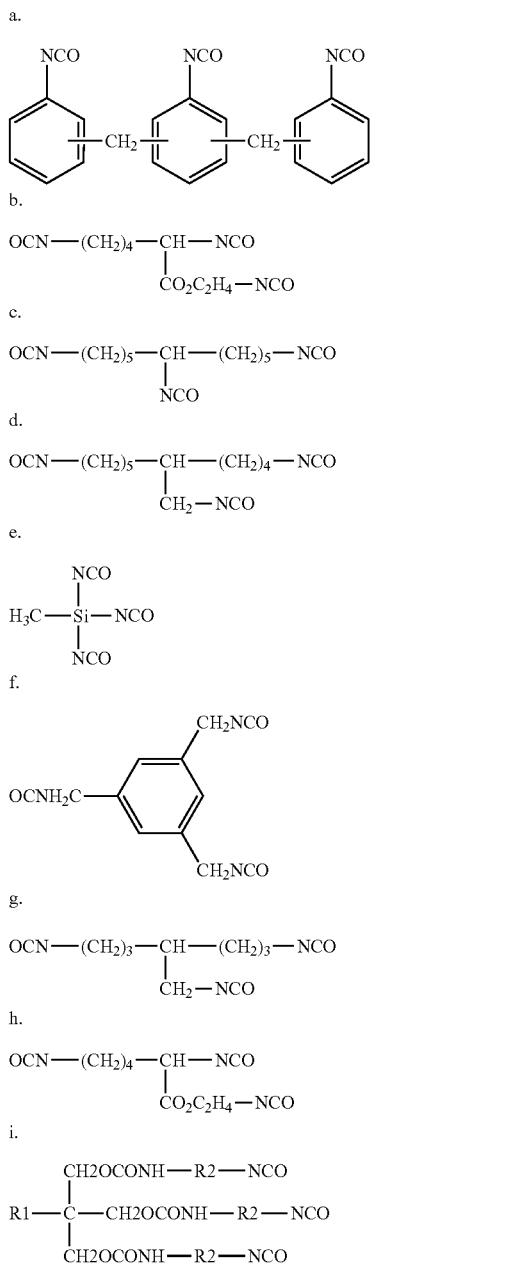

wherein $R_1$ represents an alkyl group and $R_2$ represents an alkylene group.

Examples of the tetraisocyanate compounds include compounds represented by the following j:

[Chemical Formula 2]

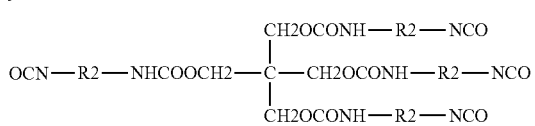

wherein $R_2$ represents an alkylene group.

Examples of the compounds having an isocyanurate structure include an isocyanurate trimer and an isocyanurate pentamer, and there also are a heptamer, a nonamer, or higher order multimers of isocyanurate.

Isocyanurate trimers are polyisocyanates made up of three molecules of diisocyanate monomer and having isocyanurate groups, and examples thereof include compounds represented by the following k:

[Chemical Formula 3]

k.

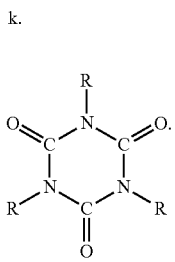

wherein R represents a diisocyanate monomer residue.

Isocyanurate pentamers are polyisocyanates made up of six molecules of diisocyanate monomer and having an isocyanurate structure, and examples thereof include compounds represented by the following l:

[Chemical Formula 4]

l.

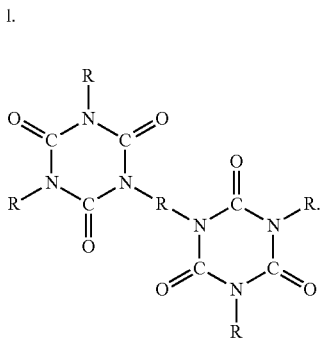

wherein R represents a diisocyanate monomer residue.

Compounds having a biuret structure are formed from urea and isocyanate groups, and examples thereof include compounds represented by the following m:

[Chemical Formula 5]

m.

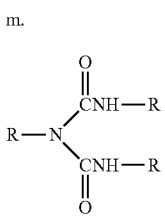

wherein R represents a diisocyanate monomer residue.

Of the above-described polyisocyanate compounds (D1), the tri- to octa-valent polyisocyanate compounds (D12) are preferred from the viewpoint of low-temperature fixing property, offset resistance, and heat resistant storage property.

Of the tri- to octa-valent polyisocyanate compounds (D12), isocyanurate and compounds containing a chemical structure of biuret are more preferred.

The amount of such a polyisocyanate compound (D1) to be used is preferably 0.2 to 2.0 equivalents in terms of isocyanate group per equivalent of the hydroxy groups of the polyester resin (a1).

Of the extenders (D), radical reaction initiators (D2) are not particularly limited, and azo compounds or diazo compounds (D21) and organic peroxides (D22) are used.

The azo compounds or diazo compounds (D21) are not particularly limited, and examples thereof include 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

The organic peroxides (D22) are not particularly limited, and examples thereof include benzoyl peroxide, di-tert-butyl peroxide, tert-butyl cumyl peroxide, dicumyl peroxide, α,α-bis(tert-butylperoxy)diisopropylbenzene, 2,5-dimethyl-2,5-bis(tert-butylperoxy)hexane, di-tert-hexyl peroxide, 2,5-dimethyl-2,5-di-tert-butylperoxyhexyne-3, acetyl peroxide, isobutyryl peroxide, octanonyl peroxide, decanonyl peroxide, lauroyl peroxide, 3,3,5-trimethylhexanoyl peroxide, m-toluyl peroxide, tert-buthylperoxy isobuthylate, tert-butylperoxy neodecanoate, cumylperoxy neodecanoate, tert-butylperoxy 2-ethylhexanoate, tert-butylperoxy-3,5,5-trimethyl haxonoate, tert-butylperoxy laurate, tert-butylperoxy benzoate, tert-butylperoxyisopropyl carbonate, and tert-butylperoxy acetate.

Of the radical reaction initiators (D2), organic peroxides (D22) are preferable because they are high in initiator efficiency and do not yield any cyan compounds by-products.

Particularly preferred among the above are reaction initiators with high ability to abstract hydrogen because they efficiently promote a crosslinking reaction and can be used in smaller amounts, and especially radical reaction initiators with high ability of hydrogen abstraction, such as benzoyl peroxide, di-tert-butyl peroxide, tert-butyl cumyl peroxide, dicumyl peroxide, (α,α-bis(tert-butylperoxy)diisopropylbenzene, 2,5-dimethyl-2,5-bis(tert-butylperoxy)hexane, and di-t-hexyl peroxide.

The amount of the radical reaction initiator (D2) to be used is not particularly limited, but it is preferably 0.1 to 10 parts by mass relative to 100 parts by mass of the polyester resin (A1). A radical reaction initiator used at 0.1 part by mass or more will tend to promote a crosslinking reaction, whereas less odor will be emitted at less than 10 parts by mass. The amount to be used is more preferably 3 parts by mass or less, even more preferably 1 part by mass or less, and particularly preferably 0.5 parts by mass or less.

In the method (2-2), there is obtained a modified non-linear polyester resin (A2) by chemically bonding a polyester resin (a2) prepared from an alcohol component (y) and an unsaturated carboxylic acid component (z), and this is a crosslinking reaction which makes a carbon-carbon linkage generate between molecules by a radical addition reaction.

As the unsaturated carboxylic acid component (z), those enumerated above can be used, and examples thereof include fumaric acid, maleic acid, maleic anhydride, citraconic acid, itaconic acid, tetrahydrophthalic acid, and ester derivatives thereof, acrylic acid, crotonic acid, methacrylic acid, and ester derivatives thereof.

Of these, fumaric acid, maleic acid, maleic anhydride, acrylic acid, methacrylic acid, etc. are preferred from the viewpoint of heat resistant storage property and reactivity.

As the alcohol component (y), those enumerated above can be use, and an alcohol having an unsaturated double bond may be used, and examples thereof include 1,4-dihydroxy-2-butene.

The content of carbon-carbon double bonds in the polyester resin (a2) is not particularly limited, and in the case of an unsaturated carboxylic acid (z), the content thereof is preferably 1 to 100 mol % based on the number of moles of the acid component that constitutes the polyester resin (a2). When the content of unsaturated double bonds is 1 mol % or more, the hot offset resistance of a toner and the image strength tend to be good and a crosslinking reaction tends to occur effectively. When the content of unsaturated double bonds is 50 mol % or less, the low-temperature fixing property of a toner tends to be good.

The peak molecular weight in GPC of the polyester resin (a2) is preferably less than 14,000, more preferably less than 12,000, and most preferably, the peak molecular weight is 3000 to 11,000.

The glass transition temperature (Tg) of the polyester resin (a2) is preferably −35° C. to 50° C., and more preferably −30° C. to 45° C. If Tg is 50° C. or lower, the low-temperature fixing property is good, and if Tg is −35° C. or higher, the heat resistant storage property is good.

From the viewpoint of electrostatic stability, the acid value of the polyester resin (a2) is preferably 0 to 20 mgKOH/g, more preferably 0 to 10 mgKOH/g, and particularly preferably 0 to 5 mgKOH/g.

In the method (2-3), there is obtained a modified non-linear polyester resin (A3) resulting from chemically bonding a polyester resin (a2) with a compound (b) having a radical reactive group and having a number average molecular weight of 1,000 or less.

This is a crosslinking reaction in which carbon-carbon bonds are formed by a radical addition reaction between the compound (b) having a radical reactive group and the polyester resin (a2).

The compound (b) to be used for a crosslinking reaction in this method has a radical reactivity group in the molecule thereof and has a number average molecular weight of 1,000 or less, and examples of the radical reactive group include vinyl groups. Examples of the vinyl groups include an allyl group, an isopropenyl group, an acrylic group, a methacrylic group, an olefin group, and a diene group.

The compound (b) is not particularly limited with respect to the type thereof, and examples thereof include vinyl ether compounds (b1), allyl alcohol compounds (b2), isopropenyl compounds (b3), and diene compounds (b4).

Examples of the vinyl ether compounds (b1) include ethyl vinyl ether, butyl vinyl ether, isobutyl vinyl ether, cyclohexyl vinyl ether, 2-ethylhexyl vinyl ether, ethylene glycol monovinyl ether, diethylene glycol ethyl vinyl ether, tetramethylene glycol monovinyl ether, cyclohexanedimethanol monovinyl ether, octadecyl vinyl ether, diethylene glycol divinyl ether, hydroquinone divinyl ether, and cyclohexanedimethanol divinyl ether.

From the viewpoint of volatility, 2-ethylhexyl vinyl ether, cyclohexanedimethanol monovinyl ether, diethylene glycol divinyl ether, and hydroquinone divinyl ether are preferred.

Examples of the allyl alcohol compound (b2) include allyl alcohol, 2-methylallyl alcohol, 1-octen-3-ol, 1-phenylallyl alcohol, 2-phenylallyl alcohol, and 3-phenylallyl alcohol.

From the viewpoint of volatility and reactivity, 1-octen-3-ol and 1-phenylallyl alcohol are preferred.

Examples of the isopropenyl compound (b3) include isopropenyl benzyl ether, 1,3-diisopropenylbenzene, 1,4-diisopropenylbenzene, and 2-isopropenylnaphthalene.

From the viewpoint of volatility and reactivity, isopropenyl benzyl ether and 1,3-diisopropenylbenzene are preferred.

Examples of the diene compound (b4) include 2-methyl-1,5-hexadiene, 1,7-octadiene, 1,9-decadiene, 1,11-dodecadiene, cyclodecadiene, cyclododecadiene, 1,5,9-cyclododecatriene, dicyclopentadiene, 2,5-norbornadiene, ethylidenenorbornene, and vinylnorbornene.

From the viewpoint of volatility and reactivity, 1,9-decadiene, 1,11-dodecadiene, and 2,5-norbornadiene are preferred.

The linear polyester resin (B) as referred to herein is a polyester resin having no branches (crosslinking points) in the main chain. Since a THF-insoluble component is generally a non-linear polyester resin, the linear polyester resin (B) may be a polyester resin containing no THF-insoluble component. Specifically, it is a polyester resin prepared by condensing an alcohol component (y), a saturated carboxylic acid component (x) and an unsaturated carboxylic acid component (z) in combination. If it does not contain any THF-insoluble component, it may theoretically have a little crosslinking points. Although it may be one which is modified at a molecular end thereof with an acid anhydride of the aforementioned saturated carboxylic acid component (x) (this may be tri-valent or more), e.g., trimellitic anhydride, phthalic anhydride and maleic anhydride, substantially no tri- to hexa- or more valent polycarboxylic acid is used for the main chain among the tri- or more valent polyols (y3) and the saturated carboxylic acid component (x).

The hydroxy value of the linear polyester resin (B) is preferably 0 to 5 mgKOH/g, more preferably 0.001 to 3 mgKOH/g, and particularly preferably 0.01 to 1 mgKOH/g. If the hydroxy value is 5 mgKOH/g or less, when, for example, the non-linear polyester resin (A1) is produced by reacting the polyester resin (a1) with the polyvalent isocyanate compound (D1) as the extender (D) in the linear polyester (B), the reaction points of the linear polyester (B) are reduced and the linear polyester (B) can be reduced in viscosity and, as a result, the low-temperature fixing property and the glossiness when used as a toner become good.

Regardless of the production method, if the hydroxy value is 5 mgKOH/g or less, the toner binder of the present invention as a whole comes to have a reduced number of hydroxyl groups and the effect to reduce $G'_{y150}$ of $G'_{x150}/G'_{y150} \geq 500$ is exhibited through reduction in the number of hydrogen bonds at ends of the soluble component, so that it becomes easy to simultaneously improve the fixing property and the storage property when used as a toner.

The acid value of the linear polyester resin (B) is preferably 5 to 30 mgKOH/g, more preferably 10 to 20 mgKOH/g, and particularly preferably 13 to 17 mgKOH/g. If the acid value is 30 mgKOH/g or less, the charging property when used as a toner is good.

From the viewpoint of simultaneously improving the heat resistant storage property and the low-temperature fixing property of a toner, the Mn of the THF-soluble component of the linear polyester resin (B) is preferably 1,000 to 15,000, more preferably 1,500 to 10,000, and particularly preferably 2,000 to 5,000.

From the viewpoint of simultaneously improving the hot offset property, the heat resistant storage property and the low-temperature fixing property of a toner, the Mw of the THF-soluble component of the linear polyester resin (B) is preferably 2,000 to 30,000, more preferably 3,000 to 20,000, and particularly preferably 4,000 to 10,000.

From the viewpoint of simultaneous improvement in low temperature fixing property, hot offset resistance, and glossiness, the weight ratio (A)/(B) of the non-linear polyester resin (A) to the linear polyester resin (B) is preferably 1/99 to 55/45, more preferably 5/95 to 40/60, particularly preferably 7/93 to 30/80, and most preferably 10/90 to 20/80.

In the present invention, the individual polyester resins can be produced in the same manner as common polyester production methods. For example, the production can be carried out by performing reaction in an inert gas (nitrogen gas or the like) atmosphere at a reaction temperature of preferably 150 to 280° C., more preferably 160 to 250° C., and particularly preferably 170 to 235° C. Moreover, from the viewpoint of ensuring the polycondensation reaction, the reaction time is preferably 30 minutes or more, and particularly preferably 2 to 40 hours.

At this time, an esterification catalyst can be used according to necessity. Examples of the esterification catalyst include: tin-containing catalysts (for example, dibutyl tin oxide), antimony trioxide, titanium-containing catalysts (for example, titanium alkoxide, potassium titanate oxalate, titanium terephthalate, titanium terephthalate alkoxide, catalysts described in JP-A-2006-243715 (titanium dihydroxy bis(triethanol aminate), titanium monohydroxy tris(triethanol aminate), titanylbis(triethanol aminate), and intramolecular polycondensation products thereof), catalysts described in JP-A-2007-11307 (titanium tributoxy terephthalate, titanium triisopropoxy terephthalate, titanium diisopropoxy diterephthalate, and the like)), zirconium-containing catalysts (for example, zirconyl acetate), and zinc acetate. Preferred out of these are titanium-containing catalysts. It is also effective to reduce pressure in order to increase the reaction velocity in the last stage of the reaction.

Moreover, a stabilizer may be added in order to acquire polyester polymerization stability. Examples of the stabilizer include hydroquinone, methylhydroquinone, and hindered phenol compounds.

The charging ratio of the alcohol component (y) to the saturated carboxylic acid component (x) (when an unsaturated carboxylic acid component (z) is use, the total of both acid components) is preferably 2/1 to 1/2, more preferably 1.5/1 to 1/1.3, and particularly preferably 1.4/1 to 1/1.2, expressed by an equivalent ratio [OH]/[COOH] of hydroxyl groups to carboxyl groups.

Preferably, the toner binder of the present invention has only one inflection point that indicates a glass transition temperature (Tg), within a temperature range of −20° C. to 80° C. in a chart produced by differential scanning calorimetry (DSC).

When it has two or more inflection points that indicate glass transition points, heat resistant storage property and fixing property are poor. It may or may not have a inflection point that indicates a glass transition temperature, at temperatures lower than −20° C. or higher than 80° C.

The glass transition temperature (Tg) is measured using differential scanning calorimetry by the method provided for in ASTM D3418-82 (the DSC method) and an inflection point that indicates a glass transition temperature (Tg) can be ascertained in a chart produced by DSC. For example, it can be measured using DSC20, SSC/580 manufactured by SEIKO Instrument Inc.

Specifically, 5 mg of a sample is put into a container of a DSC apparatus, then heated at a rate of 20° C. per minute up to a temperature about 30° C. higher than the temperature at the completion of glass transition and then cooled at a rate of 60° C. per minute down to a temperature about 50° C. lower than the glass transition temperature, and then heated at a rate of 20° C. per minute up to a temperature about 30° C. higher than the temperature of the completion of glass transition.

Based on the measurement above, a graph of the amount of endothermic or exothermic heat versus the temperature is drawn. Then, a straight line is drawn by extending the baseline of the low temperature side toward the high temperature side, and a tangent line is drawn at a point where the slope of the curve of the stepwise change portion of glass transition. The temperature corresponding to the intersection of the straight line and the tangent line is defined as the glass transition temperature (Tg). At this time, the number of the points of inflection that indicate glass transition between −20° C. to 80° C. can be ascertained.

The THF-insoluble component and the THF-soluble component of the toner binder of the present invention can be obtained by the following method.

500 ml of THF is added to 5 g of a sample, and stirred and refluxed for 3 hours. After being cooled to room temperature, the insoluble matter is filtered with a glass filter, and the resin matter remaining on the glass filter is dried until THF is completely removed, by maintaining pressure at a reduced pressure of 10 kPa or less at 80° C. for 3 hours. The resin resulting from the drying is regarded as the THF-insoluble component of the toner binder.

The solution collected through the glass filter is dried until THF is completely removed, by maintaining pressure at a reduced pressure of 10 kPa or less at 80° C. for 3 hours. The resulting resin matter is regarded as the THF-soluble component of the toner binder.

From the viewpoint of hot offset resistance at the time of toner production, the storage modulus $G'_{x150}$ (unit Pa) at 150° C. of the THF-insoluble component of the toner binder of the present invention is required to satisfy the following Formula (1).

$$G'_{x150} \geq 10,000 \quad (1)$$

The left side $G'_{x150}$ is preferably 30,000 or more, and more preferably 50,000 or more. If $G'_{x150}$ is 10,000 or more, the viscosity does not become too low in a practical application range even at a high temperature region, so that good hot offset resistance is achieved when used as a toner.

In an attempt to adjust the storage modulus G' of the THF-insoluble component of the toner binder, for example, in an attempt to increase $G'_{x150}$, this attempt can be achieved, for example, by increasing the Tm, by increasing the ratio of tri- or more valent constituent components and thereby increasing the number of crosslinking points, by increasing the molecular weight, or by making higher the Tg of the polyester resin.

The storage modulus $G'_{x150}$ (unit Pa) at 150° C. of the THF-insoluble component of the toner binder of the present invention and the storage modulus $G'_{1150}$ (unit Pa) at 150° C. of the THF-soluble component are required to satisfy the following Formula (2) from the viewpoint of the hot offset resistance and the low-temperature fixing property when used as a toner.

$$G'_{x150}/G'_{y150} \geq 500 \quad (2)$$

The left side $G'_{x150}/G'_{y150}$ is preferably 1,000 or more, and more preferably 2,000 or more.

If $G'_{x150}$, $G'_{y150}$ is 500 or more, the viscosity does not become too low in a practical application range even at a high temperature region and the viscosity is apt to decrease in a lower temperature region, so that good hot offset resistance is achieved when used as a toner and good low-temperature fixing property is also achieved.

In an attempt to adjust the of the THF-insoluble component of the toner binder, for example, in an attempt to make $G'_{x150}/G'_{y150}$ larger (in an attempt to make $G'_{x150}$ larger), this attempt can be achieved, for example, by increasing the Tm, by increasing the ratio of tri- or more valent constituent components, by increasing the number of crosslinking points, by increasing the molecular weight, or by making higher the Tg of the non-linear polyester resin (A).

In an attempt to adjust the storage modulus G' of the THF-soluble component of the toner binder, for example, in an attempt to make $G'_{x150}/G'_{y150}$ larger (in an attempt to make $G'_{y150}$ smaller), it can be attained by lowering the Tm, by reducing the molecular weight, by lowering the Tg of the linear polyester resin (B), or the like.

From the viewpoint of hot offset resistance when used as a toner, the softening point $Tm_x$ (unit ° C.) of the THF-insoluble component of the toner binder of the present invention determined using a flow tester preferably satisfies the following Formula (3).

$$140 \leq Tm_x \leq 250 \qquad (3)$$

$Tm_x$ is more preferably 150 to 245, particularly preferably 160 to 240, and most preferably 190 to 235.

If $Tm_x$ is 140 to 250, the viscosity is maintained high in a practical application range even at a high temperature region, so that good hot offset resistance is achieved when used as a toner.

In an attempt to adjust the softening point $Tm_x$ of the THF-insoluble component of the toner binder determined with a flow tester, for example, in an attempt to make $Tm_x$ larger, this attempt can be achieved, for example, by increasing the Tm, by increasing the ratio of tri- or more valent constituent components, by increasing the number of crosslinking points, by increasing the molecular weight, or by making higher the Tg of the non-linear polyester resin (A).

From the viewpoint of hot offset resistance and low-temperature fixing property when used as a toner, the softening point $Tm_x$ (unit ° C.) of the THF-insoluble component of the toner binder of the present invention determined with a flow tester and the softening point $Tm_y$ (unit ° C.) of the THF-soluble component determined with a flow tester preferably satisfy the following Formula (4).

$$Tm_x - Tm_y \geq 55 \qquad (4)$$

$Tm_x - Tm_y$ is more preferably 70 or more, and $Tm_x - Tm_y$ is even more preferably 80 or more, particularly preferably 90 or more, and most preferably 100 or more.

If $Tm_x - Tm_y$ is 55 or more, the viscosity does not become too low in a practical application range even at a high temperature region and the viscosity is apt to decrease in a lower temperature region, so that good hot offset resistance is achieved when used as a toner and good low-temperature fixing property is also achieved.

In an attempt to adjust the $Tm_x - Tm_y$, for example, in an attempt to make $Tm_x - Tm_y$ larger by an attempt to make $Tm_x$ larger, this attempt can be achieved, for example, by increasing the Tm of the non-linear polyester resin (A), by increasing the ratio of tri- or more valent constituent components, by increasing the number of crosslinking points, by increasing the molecular weight, or by making the Tg higher.

When making $Tm_y$ smaller in order to make $Tm_x - Tm_y$ larger, this can be achieved, for example, by reducing the Tm, by reducing the molecular weight, or by making lower the Tg of the linear polyester resin (B).

In the present invention, the softening point $Tm_x$ (unit ° C.) of the THF-insoluble component of a toner binder determined with a flow tester and the softening point $Tm_y$ (unit ° C.) of the THF-soluble component determined with a flow tester are measured by the following method.

Using a Koka type flow tester {a constant-load orifice-type flow tester: for example, CFT-500D manufactured by Shimadzu Corporation}, 1 g of a measurement sample is pushed through a nozzle having a diameter of 1 mm and a length of 1 mm by application of a load of 1.96 MPa by means of a plunger while it is heated at a temperature elevation rate of 6° C./min, and a graph of the "plunger descending amount (flow value)" and the "temperature" is drawn. The temperature corresponding to 1/2 of the maximum value of the descending amount of the plunger is read from the graph, and the value (a temperature at which half of the measurement sample has flowed out) is determined as the softening point [Tm].

The storage modulus $G'_{x150}$ (unit Pa) at 150° C. of the THF-insoluble component of the toner binder of the present invention and the storage modulus $G'_{x180}$ (unit Pa) at 180° C. of the THF-insoluble component are required to satisfy the following Formula (5) from the viewpoint of the hot offset resistance when used as a toner.

$$G'_{x150}/G'_{x180} \leq 10 \qquad (5)$$

The $G'_{x150}/G'_{x180}$ is preferably 9 or less, and more preferably 0.1 to 8.

If $G'_{x150}/G'_{x180}$ is 10 or less, the viscosity does not become too low in a practical application range even at a high temperature region, so that good hot offset resistance is achieved when used as a toner.

In an attempt to adjust the storage modulus G' of the THF-insoluble component of a toner binder, for example, in an attempt to reduce $G'_{x150}/G'_{x180}$, this attempt can be achieved, for example, by increasing the Tm, by increasing the ratio of tri- or more valent constituent components, by increasing the number of crosslinking points, by increasing the molecular weight, or by making higher the Tg of the polyester resin.

The ratio of the storage modulus $G'_{x150}$ (unit Pa) and the loss modulus $G''_{x150}$ (unit Pa) at 150° C. of the THF-insoluble component of the toner binder of the present invention is required to satisfy the following Formula (6) from the viewpoint of the glossiness and the hot offset resistance when used as a toner.

$$G''_{x150}/G'_{x150} \geq 0.1 \qquad (6)$$

$G''_{x150}/G'_{x150}$ is preferably 0.2 or more, more preferably 0.3 or more, and particularly preferably 0.5 or more.

If $G''_{x150}/G'_{x150}$ is 0.1 or more, the viscosity does not become too low in a practical application range even at a high temperature region and the viscosity is apt to decrease in a lower temperature region, so that good hot offset resistance is achieved when used as a toner and good low-temperature fixing property or glossiness is also achieved.

In an attempt to adjust the storage modulus G' or loss modulus G" of the THF-insoluble component of a toner binder, for example, in an attempt to make $G''_{x150}/G'_{x150}$ larger (in an attempt to make $G'_{x150}$ smaller), this attempt can be achieved, for example, by reducing the Tm, by reducing the ratio of tri- or more valent constituent components, by reducing the number of crosslinking points, by reducing the molecular weight, or by making lower the Tg of the modified non-linear polyester resin (A).

The ratio of the storage modulus $G'_{x120}$ (unit Pa) and the loss modulus $G''_{x120}$ (unit Pa) at 120° C. of the THF-soluble component of the toner binder of the present invention is required to satisfy the following Formula (7) from the viewpoint of the hot offset resistance when used as a toner.

$$G''_{y120}/G'_{y120} \leq 20 \quad (7)$$

$G''_{y120}/G'_{y120}$ is preferably 15 or less, more preferably 12 or less, particularly preferably 11 or less, and most preferably 10 or less.

If $G''_{y120}/G'_{y120}$ is 20 or less, the viscosity does not become too low in a practical application range even at a high temperature region and the viscosity is apt to decrease in a lower temperature region, so that good hot offset resistance is achieved when used as a toner and good low-temperature fixing property or glossiness is also achieved.

In an attempt to adjust the storage modulus G' or loss modulus G' of the THF-soluble component of a toner binder, for example, in an attempt to make $G''_{x120}/G'_{x120}$ smaller (in an attempt to make $G'_{x120}$ larger), this attempt can be achieved, for example, by increasing the Tm, by increasing the ratio of tri- or more valent constituent components, by increasing the number of crosslinking points, by increasing the molecular weight, by making higher the Tg, or increasing the proportion of the polyester resin (B) of the modified non-linear polyester resin (A).

From the viewpoint of low-temperature fixing property when used as a toner, the storage modulus $G'_{x60}$ (unit Pa) at 60° C. of the THF-insoluble component of the toner binder of the present invention preferably satisfies the following Formula (8).

$$G'_{x60} \leq 50{,}000{,}000 \quad (8)$$

$G'_{x60}$ is more preferably 10,000,000 or less, even more preferably 5,000,000 or less, and most preferably 1,000,000 or less.

If $G'_{x60}$ is 50,000,000 or less, the viscosity is apt to decrease in a low temperature region, so that good low-temperature fixing property is achieved.

In an attempt to reduce the storage modulus $G'_{x60}$ of the THF-insoluble component of a toner binder, this attempt can be achieved by making the Tg of the non-linear polyester resin (A) lower. If Tg is lowered, heat resistant storage property is usually deteriorated, but in the case of the toner binder of the present invention, good low-temperature fixing property can be achieved while maintaining good heat resistant storage property.

In the present invention, the storage moduli $G'_{x150}$, $G'_{x150}$, $G'_{x180}$, $G'_{y150}$, $G'_{y120}$, and $G''_{y120}$ of the THF-insoluble component and the THF-soluble component of a toner binder can be measured using the following viscoelasticity analyzer, for example.
Apparatus: ARES-24A (manufactured by Rheometric Ltd.)
Jig: 25-mm parallel plate
Frequency: 1 Hz
Strain ratio: 5%
Temperature ramp-up rate: 5° C./minute
Onset of temperature ramp-up: 100° C.
End of temperature ramp-up: 200° C.

In the present invention, the storage modulus $G'_{x60}$ of the THF-insoluble component of a toner binder can be measured using the following viscoelasticity analyzer, for example.
Apparatus: ARES-24A (manufactured by Rheometric Ltd.)
Jig: 8-mm parallel plate
Frequency: 1 Hz
Strain ratio: 5%
Temperature ramp-up rate: 5° C./minute
Onset of temperature ramp-up: 40° C.
End of temperature ramp-up: 130° C.

The hydroxy value of the toner binder of the present invention is preferably 0 to 45 mgKOH/g, more preferably 0 to 15 mgKOH/g, and most preferably 0 to 1 mgKOH/g. If the hydroxy value is 45 mgKOH/g or less, low-temperature fixing property and glossiness when used as a toner are more improved.

In the toner binder of the present invention, polyester resins preferably include a non-linear polyester resin (A) and a linear polyester resin (B), and, from the viewpoint of simultaneous improvement in the heat resistant storage property and the low-temperature fixing property of a toner, Mn, Mw, Mw/Mn, and peak molecular weight of the THF-soluble component of the toner binder of this case preferably come closer to the linear polyester resin (B) in such a manner that the non-linear polyester resin (A) is an insoluble component.

From the viewpoint of simultaneously improving the heat resistant storage property and the low-temperature fixing property of a toner, the Mn of the THF-soluble component of the toner binder of the present invention is preferably 500 to 24,000, more preferably 700 to 17,000, and particularly preferably 900 to 12,000.

From the viewpoint of simultaneously improving the hot offset resistant property and the low-temperature fixing property of a toner, the Mw of the THF-soluble component of the toner binder of the present invention is preferably 4,000 to 120,000, more preferably 7,000 to 100,000, and particularly preferably 15,000 to 80,000.

From the viewpoint of simultaneously improving the hot offset resistant property, the heat resistant storage property, and the low-temperature fixing property of a toner, the molecular weight distribution Mw/Mn of the THF-soluble component of the toner binder of the present invention is preferably 3 to 30, more preferably 4 to 28, and particularly preferably 5 to 26.

From the viewpoint of simultaneously improving the heat resistant storage property and the low-temperature fixing property of a toner, the peak molecular weight of the THF-soluble component of the toner binder of the present invention is preferably 4,000 to 120,000, more preferably 5,000 to 100,000, and particularly preferably 6,000 to 80,000.

From the viewpoint of simultaneously improving the hot offset resistant property, the low-temperature fixing property, and the glossiness, the weight ratio of the THF-insoluble component to the THF-soluble component of the toner binder of the present invention is preferably 1/99 to 41/59.

The weight ratio of the THF-insoluble component to the THF-soluble component of the toner binder of the present invention can be determined by the following method.

<Weight Ratio of THF-Insoluble Component to THF-Soluble Component>

50 ml of THF is added to 0.5 g of a sample, and stirred and refluxed for 3 hours. After being cooled, the insoluble matter is filtered with a glass filter, and the resin matter remaining on the glass filter is dried under reduced pressure at 80° C. for 3 hours. The weight of the dried resin matter remaining on the glass filter is regarded as the weight of the THF-insoluble component and the weight calculated by subtracting the weight of the THF-insoluble component from the weight of the sample is regarded as the weight of the THF-soluble component, and then the weight ratio of the THF-insoluble component to the THF-soluble component is calculated.

Description is made below regarding how to produce the toner binder of the present invention.

The method for producing the toner binder of the present invention is not particularly limited and, for example, when two types of polyester resin and additives are mixed, the mixing method may be a known method that is commonly employed and any of powder mixing, melt-mixing and solvent mixing can be employed. Mixing may also be performed at the time of toner production. Of these methods, preferred is melt-mixing, by which uniform mixing can be achieved and which does not requires removal of solvent.

Examples of the mixing device for use in powder mixing include a Henschel mixer, a Nauta mixer, and a Banbury mixer. Preferred is a Henschel mixer.

Examples of the mixing device for use in melt-mixing include batch-type mixing devices such as a reaction vessel, and continuous type mixing devices. In order to uniformly mix at an appropriate temperature in a short time, continuous type mixing devices are preferable. Examples of the continuous type mixing devices include an extruder, a continuous kneader, and a three-roll mill.

Examples of the method of solvent mixing include a method including dissolving two types of polyester resins in a solvent (e.g., ethyl acetate, THF, and acetone) to homogenize them, removing the solvent, and then performing pulverization, and a method including dissolving two types of polyester resins in a solvent (e.g., ethyl acetate, THF, and acetone), dispersing them in water, performing granulation, and removing the solvent.

When a non-linear polyester resin (A) and a linear polyester resin (B) are mixed, for example, and when it is difficult to homogenize them, it is permitted to react a polyester resin (a1) with an extender (D) in a linear polyester (B) to prepare a non-linear polyester resin (A1), so that the non-linear polyester resin (A) and the linear polyester (B) are mixed to homogenize, and this is a preferable method.

Reacting a polyester resin (a2) with an extender (D) in a linear polyester (B) to prepare a non-linear polyester resin (A2), so that the non-linear polyester resin (A) and the linear polyester (B) are mixed to homogenize, is also a preferable method.

Moreover, reacting a polyester resin (a2) with a compound (b) having a radical reactive group in the molecule thereof and having a number average molecular weight of 1,000 or less in a linear polyester (B) to prepare a non-linear polyester resin (A3), so that a non-linear polyester resin (A) and the linear polyester (B) are mixed to homogenize, is also a preferable method.

Examples of the specific method for performing the melt-mixing include a method including pouring a mixture of the polyester resin (a1) or (a2) and the linear polyester resin (B) to a twin screw extruder at a fixed rate, simultaneously pouring the extender (D) or the compound (b) at a fixed rate as well, and making them undergo a reaction while kneading and conveying them at a temperature of 100 to 200° C.

At this time, the polyester resin (a1) or (a2) and the linear polyester resin (B), which are reaction raw materials to be charged or poured into a twin screw extruder, may be poured into the extruder directly without cooling their resin reaction solutions, or alternatively, melt-mixing may be performed by feeding a material prepared by cooling and pulverizing a resin that has once been produced, to the twin screw extruder.

The method of melt-mixing is not necessarily restricted to these methods, and melt-mixing can, of course, be performed by an appropriate method such as a method including feeding raw materials to a reaction vessel, heating them to a temperature high enough for bringing them into a solution state, and mixing them.

From the viewpoint of electrostatic property, the toner binder of the present invention is required to have a content of a surfactant of 100 ppm or less.

The surfactant is a compound having both a hydrophobic part and a hydrophilic part in the molecule thereof and is a surfactant commonly used in producing a chemical toner obtained by a suspension polymerization method, an emulsion polymerization method, or the like, in which particles are produced in a water phase. The surfactant is needed in order to form stable oil droplets from resin, monomers, a polymerization initiator, a colorant, a mold release agent, etc. in a water phase.

However, the toner of the present invention contains substantially no surfactant because the toner is not a chemical toner, which requires use of a surfactant, but a toner produced by a production method not using a surfactant, e.g., a pulverization method, and therefore, the content of a surfactant is 100 ppm or less, even if contained.

Examples of the method for measuring the content of a surfactant in a toner binder include a method in which a surfactant in a toner is extracted in an organic solvent such as THF and methanol, followed by performing identification and qualification of the chemical composition using a high performance liquid chromatograph mass spectrometer (LC-MS), a nuclear magnetic resonance spectrometer (NMR), or the like.

The toner of the present invention includes the toner binder of the present invention and a colorant.

Any dyes, pigments, and the like used as colorants for toners may be used as the colorant. Specific examples thereof include carbon black, iron black, Sudan black SM, Fast Yellow G, Benzidine Yellow, Pigment Yellow, Indo Fast Orange, Irgazin Red, Paranitroaniline Red, Toluidine Red, Carmine FB, Pigment Orange R, Lake Red 2G, Rhodamine FB, Rhodamine B Lake, Methylviolet B Lake, Phthalocyanine Blue, Pigment Blue, Brilliant Green, Phthalocyanine Green, Oil Yellow GG, Kayaset YG, Orasole Brown B, and Oil Pink OP; these may be used singly or two or more of them may be used in combination. If necessary, magnetic powders (powders of ferromagnetic metals such as iron, cobalt and nickel, or such compounds as magnetite, hematite, and ferrite) may be added for serving also as a colorant.

The content of the colorant is preferably 1 to 40 parts by weight, and more preferably 3 to 10 parts by weight based on 100 parts by weight of the toner binder of the present invention. When a magnetic powder is used, the content thereof is preferably 20 to 150 parts by weight, and more preferably 40 to 120 parts by weight.

The toner of the present invention contains the toner binder, the colorant, and, if necessary, one or more additives selected from a mold release agent, a charge controlling agent, a fluidizer, etc.

Preferred as the mold release agent are those having a softening point [Tm] measured by a flow tester of 50 to 170° C., examples of which include polyolefin waxes, natural waxes, aliphatic alcohols having 30 to 50 carbon atoms, fatty acids having 30 to 50 carbon atoms, and mixtures thereof.

Examples of the polyolefin wax includes (co)polymers of olefins (e.g., ethylene, propylene, 1-butene, isobutylene, 1-hexene, 1-dodecene, 1-octadecene, and mixtures thereof) [including those obtained by (co)polymerization and thermo-degradation type polyolefins], oxides with oxygen and/or ozone of (co)polymers of olefins, maleic acid-modified ones of (co)polymers of olefins [e.g., ones which have been modified with maleic acid and derivatives thereof (maleic anhydride, monomethyl maleate, monobutyl maleate, dimethyl maleate, etc.)], copolymers of olefins and unsaturated carboxylic acids [(meth)acrylic acid, itaconic acid, maleic anhydride, etc.] and/or unsaturated carboxylic acid alkyl esters [(meth)acrylic acid alkyl (alkyl group having 1 to 18 carbon atoms) esters and maleic acid alkyl (alkyl group having 1 to 18 carbon atoms) esters, etc.], and sasol wax.

Examples of the natural waxes include carnauba wax, montan wax, paraffin wax, and rice wax. Examples of the aliphatic alcohols having 30 to 50 carbon atoms include triacontanol. Examples of the fatty acids having 30 to 50 carbon atoms include triacontane carboxylic acid.

Examples of the charge control agent include nigrosine dyes, triphenylmethane dyes containing a tertiary amine as a side chain, quaternary ammonium salts, polyamine resins, imidazole derivatives, quaternary ammonium salt group-containing polymers, metal-containing azo dyes, copper phthalocyanine dyes, salicylic acid metal salts, boron complexes of benzilic acid, sulfonic acid group-containing polymers, fluorine-containing polymers, and halogen-substituted aromatic ring-containing polymers.

Examples of the fluidizing agent include colloidal silica, alumina powder, titanium oxide powder, and calcium carbonate powder.

The amount of the mold release agent is 0 to 30% by weight, preferably 0.5 to 20% by weight, and particularly preferably 1 to 10% by weight, based on the weight of the toner.

The amount of the charge control agent is 0 to 20% by weight, preferably 0.1 to 10% by weight, and particularly preferably 0.5 to 7.5% by weight, based on the weight of the toner.

The amount of the fluidizing agent is 0 to 10% by weight, preferably 0 to 5% by weight, and particularly preferably 0.1 to 4% by weight, based on the weight of the toner.

The total amount of additives is preferably 3 to 70% by weight, preferably 4 to 58% by weight, and particularly preferably 5 to 50% by weight, based on the weight of the toner. With the composition ratio of the toner falling within the above range, those having good chargeability can be readily obtained.

The toner of the present invention may be one obtained by using any of methods such as a known kneading pulverization method, a phase-inversion emulsion method, and a polymerization method.

For example, in the case where a toner is obtained by using a kneading pulverization method, components other than a fluidizer that constitute the toner are dry-blended, then melt-kneaded, then coarsely pulverized, finally formed into fine particles by using a jet mill pulverizer or the like, further classified to form fine particles preferably having a volume average particle size (D50) within the range of from 5 to 20 μm, and mixed with a fluidizer, so that the toner can be produced.

The particle diameter (D50) can be measured using a Coulter counter [for example, trade name: Multisizer III (manufactured by Coulter)].

In the case where a toner is obtained by using a phase-inversion emulsion method, components other than a fluidizer that constitute the toner are dissolved or dispersed in an organic solvent, emulsified by, for example, adding water thereto, and separated and then classified, so that the toner can be produced. Preferably, the volume average particle diameter of the toner is 3 to 15 μm.

The toner of the present invention is, if necessary, mixed with carrier particles such as iron powders, glass beads, nickel powders, ferrite, magnetite, and ferrite with the surface thereof being coated with a resin (an acrylic resin and a silicone resin, etc.), and used as a developer for an electrostatic latent image. The weight ratio of the toner to carrier particles is usually 1/99 to 100/0. An electric latent image can also be formed by bringing into friction with a charging blade in place of the carrier particles.

The toner of the present invention is fixed on a supporting material (paper, polyester film, etc.) by a copying machine, a printer, or the like and serves as a recording material. The method for fixing it onto a supporting material may include known methods such as a heat roll fixing method and a flash fixing method.

EXAMPLES

The present invention is described below more by means of examples and comparative examples, but the present invention is not limited thereto. Hereafter, unless otherwise stated, "%" means "% by weight" and "part" means "part by weight."

<Production Example 1> <Synthesis of Linear Polyester Resin (B-1)>

A reaction vessel equipped with a cooling tube, a stirrer and a nitrogen inlet tube was charged with 655 parts of propylene oxide 2 mol adduct of bisphenol A, 68 parts of benzoic acid, and 2 parts of tetrabutoxy titanate as a condensation catalyst, which were then allowed to react at 200° C. under a nitrogen gas flow for 4 hours while distilling off water generated. Subsequently, 245 parts of terephthalic acid and 1 part of tetrabutoxytitanate as a condensation catalyst were charged and then were allowed to react under a reduced pressure of 0.5 to 2.5 kPa for 4 hours while the temperature was raised slowly to 230° C. Then, following cooling to 180° C., 32 parts of trimellitic anhydride was added and the mixture was reacted under normal pressure under hermetically sealing for 2 hours and then was reacted at 220° C. under normal pressure, and upon arrival of the hydroxy value at less than 1, the product was taken out and a linear polyester resin (B-1) was obtained.

The resulting linear polyester resin (B-1) had a hydroxy value of 0.1, an acid value of 16.0, a Tg of 56° C., a number average molecular weight of 2,500, and a weight average molecular weight of 7,100.

<Production Example 2> <Synthesis of Linear Polyester Resin (B-2)>

A reaction vessel equipped with a cooling tube, a thermometer, a stirrer, a distillation column, and a nitrogen inlet tube was charged with 539 parts of terephthalic acid, 94 parts of fumaric acid, 113 parts of ethylene glycol, 254 parts of neopentyl glycol, antimony trioxide in an amount of 1500 ppm relative to all the acid components, and a hindered phenol compound (AO-60 manufactured by ADEKA Corporation) in an amount of 2000 ppm relative to all the acid components, then heat-up was started and the reaction system was heated so that the temperature thereof would become 260° C., and then this temperature was maintained and an esterification reaction was continued until no more water evolved from the reaction system. Subsequently, the temperature in the reaction system was adjusted to 225° C. and the pressure in the reaction system was reduced, and a condensation reaction was carried out while distilling a diol component out of the reaction system. As the reaction proceeded, the viscosity of the reaction system increased, and the reaction was carried out until the torque of the stirring blade reached a value that represents a desired softening temperature. Upon exhibiting a desired torque, the reaction product was taken out and cooled, and a linear polyester resin (B-2) was obtained.

The resulting linear polyester resin (B-2) had a hydroxy value of 20, an acid value of 14.5, a Tg of 48° C., a number average molecular weight of 3, 770, and a weight average molecular weight of 9,690.

<Production Example 3> <Synthesis of Linear Polyester Resin (B-3)>

A reaction vessel equipped with a cooling tube, a stirrer and a nitrogen inlet tube was charged with 544 parts of PO 2 mol adduct of bisphenol A, 213 parts of EO 2 mol adduct of bisphenol A, 296 parts of terephthalic acid, and 2.5 parts of titanium diisopropoxybistriethanol aminate as a condensation catalyst, which were then allowed to react at 220° C. under a nitrogen gas flow for 4 hours while distilling off water generated. Moreover, a reaction was carried out under a reduced pressure of 0.5 to 2.5 kPa for 10 hours. Then, following cooling to 180° C., 9 parts of trimellitic anhydride was added and the mixture was reacted under normal pressure under hermetically sealing for 1 hour and then the product was taken out, and a linear polyester resin (B-3) was obtained.

The resulting linear polyester resin (B-3) had a hydroxy value of 46, an acid value of 5.0, a Tg of 65° C., a number average molecular weight of 2,200, and a weight average molecular weight of 6,100.

<Production Example 4> <Synthesis of Linear Polyester Resin (B-4)>

A reaction vessel equipped with a cooling tube, a stirrer and a nitrogen inlet tube was charged with of 678 parts of EO 2 mol adduct of bisphenol A, 280 parts of terephthalic acid, 77 parts of benzoic acid, and 0.6 parts of titanium diisopropoxybistriethanol aminate as a condensation catalyst, which were then allowed to react at 220° C. under a nitrogen gas flow for 4 hours while distilling off water generated. Moreover, a reaction was carried out under a reduced pressure of 0.5 to 2.5 kPa for 10 hours. Then, following cooling to 180° C., 34 parts of trimellitic anhydride was added and the mixture was reacted under normal pressure under hermetically sealing for 1 hour and then the product was taken out, and a linear polyester resin (B-4) was obtained.

The resulting linear polyester resin (B-4) had a hydroxy value of 0 5, an acid value of 20.0, a Tg of 57° C., a number average molecular weight of 2,000, and a weight average molecular weight of 5,700.

<Production Example 5> <Synthesis of Linear Polyester Resin (B-5)>

A reaction vessel equipped with a cooling tube, a stirrer and a nitrogen inlet tube was charged with 710 parts of propylene glycol, 775 parts of terephthalic acid, and 0.6 parts of titanium diisopropoxybistriethanol aminate as a condensation catalyst, which were then allowed to react at 220° C. under a nitrogen gas flow for 4 hours while distilling off water generated and an excess of propylene glycol. Moreover, after performing a reaction under a reduced pressure of 0.5 to 2.5 kPa for 10 hours, the product was taken out and a linear polyester resin (B-5) was obtained. The unreacted, recovered propylene glycol weighed 325 parts by weight.

The resulting linear polyester resin (B-5) had a hydroxy value of 45, an acid value of 1.5, a Tg of 70° C., a number average molecular weight of 2,520, and a weight average molecular weight of 7,200.

<Comparative Production Example 1> <Synthesis of Linear Polyester Resin (B'-1)>

A reaction vessel equipped with a cooling tube, a thermometer, a water separator, a stirrer and a nitrogen inlet tube was charged with 654 parts of propylene oxide 2 mol adduct of bisphenol A, 241 parts of terephthalic acid, and 105 parts of benzoic acid, which were then allowed to react at 180 to 240° C. under a nitrogen gas flow while distilling off water generated. Upon arrival of the acid value and the hydroxy value at prescribed values, the reaction product was taken out, cooled, and pulverized, and a linear polyester resin (B'-1) was obtained.

The resulting linear polyester resin (B-1) had a hydroxy value of 5, an acid value of 4.4, a Tg of 46° C., a number average molecular weight of 2,000, and a weight average molecular weight of 4,700.

<Comparative Production Example 2> <Synthesis of Linear Polyester Resin (B'-2)>

A reaction vessel equipped with a cooling tube, a stirrer and a nitrogen inlet tube was charged with 220 parts of ethylene oxide 2 mol adduct of bisphenol A, 507 parts of propylene oxide 2 mol adduct of bisphenol A, 199 parts of terephthalic acid, 45 parts of adipic acid, and 2 parts of dibutyltin oxide, which were then allowed to react at 230° C. under normal pressure for 8 hours, further allowed to react under a reduced pressure of 0.5 to 2.5 kPa for 10 hours, and after addition of 30 parts of trimellitic anhydride to the reaction vessel, further allowed to react at 180° C. under normal pressure for 2 hours. Thus, a linear polyester resin (B'-2) was synthesized.

The resulting linear polyester resin (B'-2) had a hydroxy value of 22, an acid value of 20.0, a Tg of 43° C., a number average molecular weight of 3,500, and a weight average molecular weight of 6,700.

<Comparative Production Example 3> <Synthesis of Linear Polyester Resin (B'-3)>

A reaction vessel equipped with a cooling tube, a stirrer and a nitrogen inlet tube was charged with 396 parts of propylene oxide 2 mol adduct of bisphenol A, 305 parts of ethylene oxide 2 mol adduct of bisphenol A, 259 parts of terephthalic acid, and 2 parts of dibutyltin oxide, which were then allowed to react at 230° C. under normal pressure for 8 hours, further allowed to react under a reduced pressure of 0.5 to 2.5 kPa for 10 hours, and after addition of 40 parts of trimellitic anhydride to the reaction vessel, further allowed to react at 180° C. under normal pressure for 2 hours. Thus, a linear polyester resin (B'-3) was synthesized.

The resulting linear polyester resin (B'-3) had a hydroxy value of 43, an acid value of 24.0, a Tg of 64° C., a number average molecular weight of 2,200, and a weight average molecular weight of 6,000.

TABLE 1

| Linear polyester resin (B) | | | Production Example 1 (B-1) | Production Example 2 (B-2) | Production Example 3 (B-3) | Production Example 4 (B-4) | Production Example 5 (B-5) | Comparative Production Example 1 (B'-1) | Comparative Production Example 2 (B'-2) | Comparative Production Example 3 (B'-3) |
|---|---|---|---|---|---|---|---|---|---|---|
| Composition (parts by weight) | Alcohol component | PO 2 mol adduct of bisphenol A | 655 | — | 544 | — | — | 654 | 507 | 396 |
| | | EO 2 mol adduct of bisphenol A | — | — | 213 | 678 | — | — | 220 | 305 |
| | | Ethylene glycol | — | 113 | — | — | — | — | — | — |
| | | Propylene glycol | — | — | — | — | 385 | — | — | — |
| | | Neopentyl glycol | — | 254 | — | — | — | — | — | — |
| | Carboxylic acid component | Adipic acid | — | — | — | — | — | — | 45 | — |
| | | Terephthalic acid | 245 | 539 | 296 | 280 | 775 | 241 | 199 | 259 |
| | | Fumaric acid | — | 94 | — | — | — | — | — | — |
| | | Benzoic acid | 68 | — | — | 77 | — | 105 | — | — |
| | | Trimellitic anhydride | 32 | — | 9 | 34 | — | — | 30 | 40 |
| Properties | | Acid value (KOHmg/g) | 16.0 | 14.5 | 5.0 | 20.0 | 1.5 | 4.4 | 20.0 | 24.0 |
| | | Hydroxy value (KOHmg/g) | 0.1 | 20 | 46 | 0.5 | 45 | 5 | 22 | 43 |
| | | Tg(° C.) | 56 | 48 | 65 | 57 | 70 | 46 | 43 | 64 |
| | | Mn | 2,500 | 3,770 | 2,200 | 2,000 | 2,520 | 2,000 | 3,500 | 2,200 |
| | | Mw | 7,100 | 9,690 | 6,100 | 5,700 | 7,200 | 4,700 | 6,700 | 6,000 |

<Production Example 6> <Synthesis of Polyester Resin (a1-1)>

A reaction vessel equipped with a cooling tube, a thermometer, a stirrer and a nitrogen inlet tube was charged with 178 parts of propylene oxide 2 mol adduct of bisphenol A, 301 parts of 3-methyl-1,5-pentanediol, 12 parts of trimethylolpropane, 509 parts of terephthalic acid, and 2 parts of tetrabutoxy titanate as a condensation catalyst, which were then allowed to react at 220° C. under a nitrogen gas flow for 4 hours while distilling off water generated. Moreover, the reaction was carried out under a reduced pressure of 0.5 to 2.5 kPa for 10 hours. Upon arrival of the acid value at less than 1, the product was taken out and a polyester resin (a1-1) was obtained.

The polyester resin (a1-1) had a peak molecular weight of 8,700, a Tg of 16° C., an acid value of 0.4, a hydroxy value of 35, a number average molecular weight of 3,200, and a weight average molecular weight of 9,400.

<Production Example 7> <Synthesis of Polyester Resin (a2-1)>

A reaction vessel equipped with a cooling tube, a thermometer, a stirrer, a distillation column, and a nitrogen inlet tube was charged with 711 parts of terephthalic acid, 123 parts of fumaric acid, 351 parts of ethylene glycol, antimony trioxide in an amount of 1500 ppm relative to all the acid components, and a hindered phenol compound (AO-60 manufactured by ADEKA Corporation) in an amount of 2000 ppm relative to all the acid components, then heat-up was started and the reaction system was heated so that the temperature thereof would become 260° C., and then this temperature was maintained and an esterification reaction was continued until no more water evolved from the reaction system. Subsequently, the temperature in the reaction system was adjusted to 225° C. and the pressure in the reaction system was reduced, and a condensation reaction was carried out while distilling a diol component out of the reaction system. As the reaction proceeded, the viscosity of the reaction system increased, and the reaction was carried out until the torque of the stirring blade reached a value that represents a desired softening temperature. Upon exhibiting a desired torque, the reaction product was taken out and cooled, and a polyester resin (a2-1) was obtained.

The polyester resin (a2-1) had a peak molecular weight of 9,000, a Tg of 40° C., a hydroxy value of 34, an acid value of 0.5, a number average molecular weight of 3,300, and a weight average molecular weight of 10,000.

<Production Example 8> <Synthesis of Polyester Resin (a2-2)>

A reaction vessel equipped with a cooling tube, a stirrer and a nitrogen inlet tube was charged with 751 parts of EO 2 mol adduct of bisphenol A, 132 parts of terephthalic acid, 142 parts of adipic acid, 46 parts of fumaric acid, 0.6 parts of titanium diisopropoxybistriethanol aminate as a condensation catalyst, and 5 parts of tert-butylcatechol as a polymerization inhibitor, which were then allowed to react at 180° C. under a nitrogen gas flow for 4 hours while distilling off water generated. Moreover, after performing a reaction under a reduced pressure of 0.5 to 2.5 kPa for 10 hours, the product was taken out and a polyester resin (a2-2) was obtained.

The polyester resin (a2-2) had a peak molecular weight of 13,100, a Tg of 40° C., a hydroxy value of 21, an acid value of 1.3, a number average molecular weight of 6,500, and a weight average molecular weight of 18,200.

<Production Example 9> <Synthesis of Polyester Resin (a2-3)>

A reaction vessel equipped with a cooling tube, a stirrer and a nitrogen inlet tube was charged with 556 parts of PO 2 mol adduct of bisphenol A, 18 parts of trimethylolpropane, 94 parts of 3-methyl-1,5-pentanediol, 265 parts of terephthalic acid, 60 parts of adipic acid, 56 parts of fumaric acid, 0.6 parts of titanium diisopropoxybistriethanol aminate as a condensation catalyst, and 5 parts of tert-butylcatechol as a polymerization inhibitor, which were then allowed to react at 180° C. under a nitrogen gas flow for 4 hours while distilling off water generated. Moreover, a reaction was carried out under a reduced pressure of 0.5 to 2.5 kPa for 10 hours. Then, 34 parts of trimellitic anhydride was added and the mixture was reacted under normal pressure under hermetically sealing for 1 hour and then the product was taken out, and a polyester resin (a2-3) was obtained.

The polyester resin (a2-3) had a peak molecular weight of 8,000, a Tg of 20° C., a hydroxy value of 28, an acid value of 20.2, a number average molecular weight of 2,900, and a weight average molecular weight of 9,100.

<Production Example 10> <Synthesis of Polyester Resin (a2-4)>

A reaction vessel equipped with a cooling tube, a stirrer and a nitrogen inlet tube was charged with the alcohol components and the carboxylic components shown in Table 2, and then a reaction was performed in the same manner as Production Example 9 except the above, so that a polyester resin (a2-4) was obtained.

In Table 2 are shown the peak top molecular weight, the Tg, the hydroxy value, the acid value, the number average molecular weight, and the weight average molecular weight.

<Production Example 11> <Synthesis of Polyester Resin (a2-5)>

A reaction vessel equipped with a cooling tube, a stirrer and a nitrogen inlet tube was charged with 755 parts of EO 2 mol adduct of bisphenol A, 14 parts of trimethylolpropane, 112 parts of terephthalic acid, 106 parts of adipic acid, 81 parts of fumaric acid, 0.6 parts of titanium diisopropoxybistriethanol aminate as a condensation catalyst, and 5 parts of tert-butylcatechol as a polymerization inhibitor, which were then allowed to react at 180° C. under a nitrogen gas flow for 4 hours while distilling off water generated. Moreover, after performing a reaction under a reduced pressure of 0.5 to 2.5 kPa for 10 hours, the product was taken out and a polyester resin (a2-5) was obtained.

In Table 2 are shown the peak top molecular weight, the Tg, the hydroxy value, the acid value, the number average molecular weight, and the weight average molecular weight.

<Production Example 12> <Synthesis of Polyester Resin (a2-6)>

A reaction vessel equipped with a cooling tube, a stirrer and a nitrogen inlet tube was charged with the alcohol components and the carboxylic components shown in Table 2, and then a reaction was performed in the same manner as Production Example 11 except the above, so that a polyester resin (a2-6) was obtained.

In Table 2 are shown the peak top molecular weight, the Tg, the hydroxy value, the acid value, the number average molecular weight, and the weight average molecular weight.

<Production Example 13> <Synthesis of Polyester Resin (a2-7)>

A reaction vessel equipped with a cooling tube, a stirrer and a nitrogen inlet tube was charged with the alcohol components and the carboxylic components shown in Table 2, and then a reaction was performed in the same manner as Production Example 11 except the above, so that a polyester resin (a2-7) was obtained.

In Table 2 are shown the peak top molecular weight, the Tg, the hydroxy value, the acid value, the number average molecular weight, and the weight average molecular weight.

<Comparative Production Example 4> <Synthesis of Polyester Resin (a2'-1)>

A reaction vessel equipped with a cooling tube, a thermometer, a stirrer, a distillation column, and a nitrogen inlet tube was charged with 505 parts of terephthalic acid, 88 parts of fumaric acid, 188 parts of ethylene glycol, 219 parts of 1,4-cyclohexanedimethanol, antimony trioxide in an amount of 1500 ppm relative to all the acid components, and a hindered phenol compound (AO-60 manufactured by ADEKA Corporation) in an amount of 2000 ppm relative to all the acid components, then heat-up was started and the reaction system was heated so that the temperature thereof would become 260° C., and then this temperature was maintained and an esterification reaction was continued until no more water evolved from the reaction system. Subsequently, the temperature in the reaction system was adjusted to 225° C. and the pressure in the reaction system was reduced, and a condensation reaction was carried out while distilling a diol component out of the reaction system. As the reaction proceeded, the viscosity of the reaction system increased, and the reaction was carried out until the torque of the stirring blade reached a value that represents a desired softening temperature. Upon exhibiting a desired torque, the reaction product was taken out and cooled, and a polyester resin (a2'-1) was obtained.

The polyester resin (a2'-1) had a peak molecular weight of 20,310, a Tg of 61° C., a hydroxy value of 11, an acid value of 2.5, a number average molecular weight of 7,190, and a weight average molecular weight of 38,840. The results are shown in Table 2.

<Comparative Production Example 5> <Synthesis of Polyester Resin (a1'-1)>

A reaction vessel equipped with a cooling tube, a thermometer, a water separator, a stirrer and a nitrogen inlet tube was charged with 583 parts of propylene oxide 2 mol adduct of bisphenol A, 56 parts of trimethylolpropane, 56 parts of stearic acid, and 304 parts of isophthalic acid, which were then allowed to react at 180 to 240° C. under a nitrogen gas flow while distilling off water generated. Upon arrival of the acid value and the hydroxy value at prescribed values, the reaction product was taken out, cooled, and pulverized, and a polyester resin (a1'-1) was obtained.

The polyester resin (a1'-1) had a peak molecular weight of 8,500, a Tg of 41° C., a hydroxy value of 55, an acid value of 13.0, a number average molecular weight of 3,000, and a weight average molecular weight of 9,100. The results are shown in Table 2.

<Comparative Production Example 6> <Synthesis of Polyester Resin (a1'-2)>

A reaction vessel equipped with a cooling tube, a stirrer and a nitrogen inlet tube was charged with 640 parts of ethylene oxide 2 mol adduct of bisphenol A, 76 parts of propylene oxide 2 mol adduct of bisphenol A, 264 parts of terephthalic acid, 20 parts of trimellitic anhydride, and 0.5 parts of dibutyltin oxide, which were then allowed to react at 230° C. under normal pressure for 5 hours, and thus a polyester resin (a1'-2) was synthesized.

The resulting polyester resin (a1'-2) had a peak molecular weight of 8,900, a Tg of 55° C., a hydroxy value of 51, an acid value of 0 5, a number average molecular weight of 2,100, and a weight average molecular weight of 9,500. The results are shown in Table 2.

Comparative Production Example 7

<Synthesis of Polyester Resin (a1'-3)>
A reaction vessel equipped with a cooling tube, a stirrer and a nitrogen inlet tube was charged with 513 parts of propylene oxide 2 mol adduct of bisphenol A, 179 parts of ethylene oxide 2 mol adduct of bisphenol A, 196 parts of terephthalic acid, and 2 parts of dibutyltin oxide, which were then allowed to react at 230° C. under normal pressure for 8 hours, further allowed to react under a reduced pressure of 0.5 to 2.5 kPa for 10 hours, and after addition of 112 parts of trimellitic anhydride to the reaction vessel, further allowed to react at 180° C. under normal pressure for 2 hours. Thus, a polyester resin (a1'-3) was synthesized.

The resulting polyester resin (a1'-3) had a peak molecular weight of 5,100, a Tg of 60° C., a hydroxy value of 37, an acid value of 20.0, a number average molecular weight of 2,600, and a weight average molecular weight of 22,000. The results are shown in Table 2.

TABLE 2

| Polyester resin (a) | | | Production Example 6 (a1-1) | Production Example 7 (a2-1) | Production Example 8 (a2-2) | Production Example 9 (a2-3) | Production Example 10 (a2-4) | Production Example 11 (a2-5) | Production Example 12 (a2-6) |
|---|---|---|---|---|---|---|---|---|---|
| Composition (parts by weight) | Alcohol component | PO 2 mol adduct of bisphenol A | 178 | — | — | 556 | — | — | — |
| | | EO 2 mol adduct of bisphenol A | — | — | 751 | — | — | 755 | — |
| | | TMP | 12 | — | — | 18 | 33 | 14 | 32 |
| | | Ethylene glycol | — | 351 | — | — | — | — | — |
| | | 1,4-Cyclohexanedimethanol | — | — | — | — | — | — | — |
| | | 3-Methyl-1,5-pentanediol | 301 | — | — | 94 | 494 | — | 498 |
| | Carboxylic acid component | Stearic acid | — | — | — | — | — | — | — |
| | | Isophthalic acid | — | — | — | — | — | — | — |
| | | Terephthalic acid | 509 | 711 | 132 | 265 | 350 | 112 | 347 |
| | | Fumaric acid | — | 123 | 46 | 56 | 164 | 81 | 163 |
| | | Adipic acid | — | — | 142 | 60 | 106 | 106 | 105 |
| | | Trimellitic anhydride | — | — | — | 34 | — | — | — |
| Properties | | Peak molecular weight | 8,700 | 9,000 | 13,100 | 8,000 | 10,500 | 8,500 | 10,000 |
| | | Acid value (KOHmg/g) | 0.4 | 0.5 | 1.3 | 20.2 | 0.3 | 0.8 | 1.0 |
| | | Hydroxy value (KOHmg/g) | 35 | 34 | 21 | 28 | 32 | 42 | 41 |
| | | Tg(° C.) | 16 | 40 | 40 | 20 | −15 | 35 | −20 |
| | | Mn | 3,200 | 3,300 | 6,500 | 2,900 | 3,600 | 2,700 | 2,800 |
| | | Mw | 9,400 | 10,000 | 18,200 | 9,100 | 21,600 | 9,000 | 10,700 |

| Polyester resin (a) | | | Production Example 13 (a2-7) | Comparative Production Example 4 (a2'-1) | Comparative Production Example 5 (a1'-1) | Comparative Production Example 6 (a1'-2) | Comparative Production Example 7 (a1'-3) |
|---|---|---|---|---|---|---|---|
| Composition (parts by weight) | Alcohol component | PO 2 mol adduct of bisphenol A | — | — | 583 | 76 | 513 |
| | | EO 2 mol adduct of bisphenol A | 740 | — | — | 640 | 179 |
| | | TMP | 14 | — | 56 | — | — |
| | | Ethylene glycol | — | 188 | — | — | — |
| | | 1,4-Cyclohexanedimethanol | — | 219 | — | — | — |
| | | 3-Methyl-1,5-pentanediol | — | — | — | — | — |
| | Carboxylic acid component | Stearic acid | — | — | 56 | — | — |
| | | Isophthalic acid | — | — | 304 | — | — |
| | | Terephthalic acid | 192 | 505 | — | 264 | 196 |
| | | Fumaric acid | 83 | 88 | — | — | — |
| | | Adipic acid | 41 | — | — | — | — |
| | | Trimellitic anhydride | — | — | — | 20 | 112 |
| Properties | | Peak molecular weight | 11,000 | 20,310 | 8,500 | 8,900 | 5,100 |
| | | Acid value (KOHmg/g) | 0.4 | 2.5 | 13.0 | 0.5 | 20.0 |
| | | Hydroxy value (KOHmg/g) | 30 | 11 | 55 | 51 | 37 |
| | | Tg(° C.) | 48 | 61 | 41 | 55 | 60 |
| | | Mn | 3,700 | 7,190 | 3,000 | 2,100 | 2,600 |
| | | Mw | 11,100 | 38,840 | 9,100 | 9,500 | 22,000 |

<Example 1> <Production of Toner Binder (C-1)>

To a twin screw kneader (S5KRC Kneader manufactured by Kurimoto, Ltd.) were fed 90.3 parts of the linear polyester resin (B-1) obtained in Production Example 1 and 9.7 parts of the polyester resin (a1-1) obtained by Production Example 6 at a rate of 10 kg/h, and at the same time, 3.4 parts of a polyvalent isocyanate compound DURANATE TPA-100 (produced by Asahi Kasei Chemicals) (D1-1) as an extender (D) was fed at a rate of 0.34 kg/h for 10 minutes, and a kneading extrusion reaction was carried out at 150° C.

The resulting kneaded reaction product was cooled and, as a result, there was obtained a toner binder (C-1) of the present invention containing the linear polyester resin (B-1) and a non-linear polyester resin (A1-1) produced by reacting the polyester resin (a1-1) and (D1-1) at a blending ratio of 9.7/3.4 in weight ratio.

Physical properties of the resulting toner binder, physical properties of the THF-soluble component of the toner binder, and physical properties of the THF-insoluble component of the toner binder are shown in Table 3.

The content of the surfactant in the toner binder in the toner of Example 1 of the present invention was measured by the following method.
(1)<Sample Preparation>

A toner or toner binder (200 mg) was weighed into a screw tube and 25 ml of methanol was put thereinto, followed by irradiation with supersonic waves for 30 minutes, so that a surfactant was extracted. Then, centrifugal separation was performed and the resulting supernatant liquid was sampled and filtered, and thus a sample for measurement was prepared.
(2) The measurement conditions are as follows:
Analyzer: LCMS-8030 (manufactured by Shimadzu Corporation)
Column: InertSustainSwift (manufactured by GL Sciences Inc.) 1.9 µm in particle diameter, 2.1 mm in inner diameter, and 50 mm in length
Mobile phase: A(aqueous ammonium acetate solution/methanol=80/20), B methanol, A/B=40/60
Flow rate: 0.3 mL/minute
Injection amount: 0.2 µl
Ion source: ESI (±)

In the present quantitative analytical method, since the detection limit was an amount of the surfactant of 5 ppm or less, the cases where the amount of a surfactant was 5 ppm or less were denoted by "Not Detected" in Table 3 for all examples and some comparative examples performed by the pulverization method.

<Example 2> <Production of Toner Binder (C-2)>

To a twin screw kneader were fed 85.5 parts of the linear polyester resin (B-1) obtained in Production Example 1 and 14.5 parts of the polyester resin (a1-1) obtained in Production Example 6 at a rate of 10 kg/h, and at the same time, 5.1 parts of a polyvalent isocyanate compound DURANATE TPA-100 (D1-1) as an extender (D) was fed at a rate of 0.51 kg/h for 10 minutes, and a kneading extrusion reaction was carried out at 150° C.

The resulting kneaded reaction product was cooled and, as a result, there was obtained a toner binder (C-2) of the present invention containing the linear polyester resin (B-1) and a non-linear polyester resin (A1-2) produced by reacting the polyester resin (a1-1) and (D1-1) at a blending ratio of 14.5/5.1 in weight ratio.

<Example 3> <Production of Toner Binder (C-3)>

90.0 parts of the linear polyester resin (B-2) obtained in Production Example 2, 10.0 parts of the polyester resin (a2-1) obtained in Production Example 7, and 0.4 parts of benzoyl peroxide NYPER BW (manufactured by NOF Corporation) (D2-1) as a radical reaction initiator (D2) as an extender were mixed, then fed to a twin screw extruder (PCM-30 manufactured by Ikegai Corp) and melt-kneaded to undergo a crosslinking reaction and, as a result, there was obtained a toner binder (C-3) of the present invention containing the linear polyester resin (B-2) and a non-linear polyester resin (a2-1) resulting from a reaction of the polyester resin (a2-1) itself caused by (D2-1).

<Example 4> <Production of Toner Binder (C-4)>

90.0 parts of the linear polyester resin (B-1) obtained in Production Example 1, 10.0 parts of the polyester resin (a2-1) obtained in Production Example 7, and 0.4 parts of benzoyl peroxide NYPER BW (D2-1) as a radical reaction initiator as an extender were mixed, then fed to a twin screw extruder and melt-kneaded to undergo a crosslinking reaction and, as a result, there was obtained a toner binder (C-4) of the present invention containing the linear polyester resin (B-1) and a non-linear polyester resin (A2-2) resulting from a reaction of the polyester resin (a2-1) itself caused by (D2-1).

<Example 5> <Production of Toner Binder (C-5)>

30.0 parts of the polyester resin (a2-2) obtained in Production Example 8 and 70.0 parts of the linear polyester resin (B-3) obtained in Production Example 3 were fed to a twin screw kneader (S1KRC Kneader manufactured by Kurimoto, Ltd.) at a rate of 504 g/h, and at the same time, 1.0 parts of PERBUTYL Z (D2-2) as a radical reaction initiator was fed at a rate of 10 g/h, and they were kneaded and extruded at 150° C. for 100 minutes, and thus a crosslinking reaction was carried out. As a result, there was obtained a toner binder (C-5) of the present invention containing the linear polyester resin (B-3) and a non-linear polyester resin (A2-3) resulting from a reaction of the polyester resin (a2-2) itself caused by (D2-2).

Example 6

<Production of Toner Binder (C-6)>

30.0 parts of the polyester resin (a2-3) obtained in Production Example 9 and 70.0 parts of the linear polyester resin (B-4) obtained in Production Example 4 were fed to a twin screw kneader (SSKRC Kneader manufactured by Kurimoto, Ltd.) at a rate of 10 kg/h, and at the same time, 1.0 parts of PERBUTYL D (D2-3) as a radical reaction initiator was fed at a rate of 0.10 kg/h, and they were kneaded and extruded at 170° C. for 15 minutes, and thus a crosslinking reaction was carried out. As a result, there was obtained a toner binder (C-6) of the present invention containing the linear polyester resin (B-4) and a non-linear polyester resin (A2-4) resulting from a reaction of the polyester resin (a2-3) itself caused by (D2-3).

<Example 7> <Production of Toner Binder (C-7)>

20.0 parts of the polyester resin (a2-4) obtained in Production Example 10 and 80.0 parts of the linear polyester resin (B-5) obtained in Production Example 5 were fed to a twin screw kneader (SSKRC Kneader manufactured by Kurimoto, Ltd.) at a rate of 10 kg/h, and at the same time, 1.0 parts of PERBUTYL D (D2-3) as a radical reaction initiator was fed at a rate of 0.10 kg/h, and they were kneaded and extruded at 170° C. for 15 minutes, and thus a crosslinking reaction was carried out. As a result, there was obtained a toner binder (C-7) of the present invention containing the linear polyester resin (B-5) and a non-linear polyester resin (A2-5) resulting from a reaction of the polyester resin (a2-4) itself caused by (D2-3).

<Example 8> <Production of Toner Binder (C-8)>

30.0 parts of the polyester resin (a2-5) obtained in Production Example 11 and 70.0 parts of the linear polyester resin (B-4) obtained in Production Example 4 were fed to a twin screw kneader (SSKRC Kneader manufactured by Kurimoto, Ltd.) at a rate of 10 kg/h, and at the same time 1.0 parts of diethylene glycol divinyl ether (b-1) and 1.0 parts of PERBUTYL D (D2-3) as a radical reaction initiator were fed at a rate of 0.10 kg/h, and they were kneaded and extruded at 170° C. for 15 minutes, and thus a crosslinking reaction was carried out. As a result, there was obtained a toner binder (C-8) of the present invention containing the linear polyester resin (B-4) and a non-linear polyester resin (A3-1) produced by chemically bonding the polyester resin (a2-5) with (b-1).

<Example 9> <Production of Toner Binder (C-9)>

20.0 parts of the polyester resin (a2-6) obtained in Production Example 12 and 80.0 parts of the linear polyester resin (B-5) obtained in Production Example 5 were fed to a twin screw kneader (SSKRC Kneader manufactured by Kurimoto, Ltd.) at a rate of 10 kg/h, and at the same time 2.0 parts of diethylene glycol divinyl ether (b-1) and 1.0 parts of PERBUTYL P (D2-4) as a radical reaction initiator were fed at a rate of 0.10 kg/h, and they were kneaded and extruded at 170° C. for 15 minutes, and thus a crosslinking reaction was carried out. As a result, there was obtained a toner binder (C-9) of the present invention containing the linear polyester resin (B-5) and a non-linear polyester resin (A3-2) produced by chemically bonding the polyester resin (a2-6) with (b-1).

<Example 10> <Production of Toner Binder (C-10)>

25.0 parts of the polyester resin (a2-7) obtained in Production Example 13 and 75.0 parts of the linear polyester resin (B-4) obtained in Production Example 4 were fed to a twin screw kneader (SSKRC Kneader manufactured by Kurimoto, Ltd.) at a rate of 10 kg/h, and at the same time 1.0 parts of diethylene glycol divinyl ether (b-1) and 1.0 parts of PERBUTYL Z (D2-2) as a radical reaction initiator were fed at a rate of 0.10 kg/h, and they were kneaded and extruded at 170° C. for 15 minutes, and thus a crosslinking reaction was carried out. As a result, there was obtained a toner binder (C-10) of the present invention containing the linear polyester resin (B-4) and a non-linear polyester resin (A3-3) produced by chemically bonding the polyester resin (a2-7) with (b-1).

<Example 11> <Production of Toner Binder (C-11)>

30.0 parts of the polyester resin (a2-5) obtained in Production Example 11 and 70.0 parts of the linear polyester resin (B-4) obtained in Production Example 4 were fed to a twin screw kneader (SSKRC Kneader manufactured by Kurimoto, Ltd.) at a rate of 10 kg/h, and at the same time, 1.0 parts of PERBUTYL Z (D2-2) as a radical reaction initiator was fed at a rate of 0.10 kg/h, and they were kneaded and extruded at 170° C. for 15 minutes, and thus a crosslinking reaction was carried out. As a result, there was obtained a toner binder (C-11) of the present invention containing the linear polyester resin (B-4) and a non-linear polyester resin (A2-6) resulting from a reaction of the polyester resin (a2-5) itself caused by (D2-2).

<Example 12> <Production of Toner Binder (C-12)>

25.0 parts of the polyester resin (a2-5) obtained in Production Example 11 and 75.0 parts of the linear polyester resin (B-5) obtained in Production Example 5 were fed to a twin screw kneader (SSKRC Kneader manufactured by Kurimoto, Ltd.) at a rate of 10 kg/h, and at the same time, 1.0 parts of PERBUTYL Z (D2-2) as a radical reaction initiator was fed at a rate of 0.10 kg/h, and they were kneaded and extruded at 170° C. for 15 minutes, and thus a crosslinking reaction was carried out. As a result, there was obtained a toner binder (C-12) of the present invention containing the linear polyester resin (B-5) and a non-linear polyester resin (A2-7) resulting from a reaction of the polyester resin (a2-5) itself caused by (D2-2).

<Example 13> <Production of Toner Binder (C-13)>

30.0 parts of the polyester resin (a2-5) obtained in Production Example 11 and 70.0 parts of the linear polyester resin (B-5) obtained in Production Example 5 were fed to a twin screw kneader (SSKRC Kneader manufactured by Kurimoto, Ltd.) at a rate of 10 kg/h, and at the same time 5.0 parts of a mixture (b'-1) of 3.65 parts of styrene/1.03 parts of butyl acrylate/0.31 parts of monobutyl maleate and 1.0 parts of PERBUTYL Z (D2-2) as a radical reaction initiator were fed at a rate of 0.10 kg/h, and they were kneaded and extruded at 170° C. for 15 minutes, and thus a crosslinking reaction was carried out. As a result, there was obtained a toner binder (C-13) of the present invention containing the linear polyester resin (B-5) and a non-linear polyester resin (A2-8) resulting from a reaction of the polyester resin (a2-5) itself caused by (D2-2).

<Comparative Example 1> <Production of Toner Binder (C'-1)>

95.0 parts of the linear polyester resin (B-2) obtained in Production Example 2, 5.0 parts of the polyester resin (a2'-1) obtained in Comparative Production Example 4, and 0.4 parts of benzoyl peroxide NYPER BW (D2-1) as a radical reaction initiator as an extender were mixed, then fed to a twin screw extruder and melt-kneaded to undergo a crosslinking reaction and, as a result, there was obtained a toner binder (C'-1) containing the linear polyester resin (B-2) and a non-linear polyester resin (A'-1) resulting from a reaction of the polyester resin (a2'-1) itself caused by (c-2).

<Comparative Example 2> <Production of Toner Binder (C'-2)>

To a twin screw kneader were fed 60.0 parts of the linear polyester resin (B'-1) obtained in Comparative Production Example 1 and 40.0 parts of the polyester resin (a1'-1) obtained in Comparative Production Example 5 at a rate of 10 kg/h, and at the same time, 3.4 parts of a polyvalent isocyanate compound, tolylene diisocyanate (CORONATE T-80 manufactured by Tosoh Corporation) (D1-2) as an extender was fed at a rate of 0.34 kg/h, and a kneading extrusion reaction was carried out at 150° C. The resultant was cooled and, as a result, there was obtained a toner binder (C'-2) containing the linear polyester resin (B'-1) and a non-linear polyester resin (A'-2) produced by reacting the polyester resin (a1'-1) and (D1-2) at a blending ratio of 40/3.4 in weight ratio.

<Comparative Example 3> <Production of Resin Particle (C'-3)>

<Preparation of Particulate Dispersion Liquid 1>

A reaction vessel with a stirring rod and a thermometer was charged with 683 parts of water, 11 parts of methacrylic acid ethylene oxide adduct sulfate sodium salt (Eleminol RS-30 manufactured by Sanyo Chemical Industries, Ltd.), 83 parts of styrene, 83 parts of methacrylic acid, 110 parts of butyl acrylate, and 1 part of ammonium persulfate, which were then stirred at 400 rpm for 15 minutes to obtain a white emulsion. This was heated to raise the temperature in the system to 75° C., and a reaction was performed for 5 hours.

Further, 30 parts of a 1% aqueous solution of ammonium persulfate was added, and the mixture was matured at 75° C. for 5 hours, affording a water-based dispersion [particulate dispersion liquid 1] of a vinyl resin (a styrene-methacrylic acid-butyl acrylate-methacrylic acid ethylene oxide adduct sulfate sodium salt copolymer). The [particulate dispersion liquid 1] had a volume average particle diameter of 105 nm as measured with LA-920. A portion of the [particulate dispersion liquid 1] was dried and a resin material was thereby isolated. The resin material in the dispersion liquid had a Tg of 59° C. and a weight average molecular weight of 150,000.

<Preparation of Water Phase>

990 parts of water, 83 parts of the particulate dispersion liquid 1, 37 parts of a 48.5% aqueous solution of a surfactant, sodium dodecyl diphenyl ether disulfonate, ("Eleminol MON-7"; manufactured by Sanyo Chemical Industries, Ltd.), and 90 parts of ethyl acetate were mixed and stirred, and thus a milk white liquid (water phase) was obtained.

<Preparation of Organic Solvent Phase>

A reaction vessel equipped with a stirring rod and a thermometer was charged with 500 parts of the polyester resin (B'-2) synthesized in Comparative Production Example 2 and 500 parts of ethyl acetate, which was then heated to 80° C. under stirring and held at 80° C. for 30 hours and then cooled to 30° C. over 1 hour. Thus, a raw material solution was obtained.

The solid concentration of the resulting organic solvent phase (130° C., 30 minutes) was 50%.

<Synthesis of Modified Polyester Having Substituent Capable of Reacting>

A reaction vessel equipped with a cooling tube, a stirrer, and a nitrogen inlet tube was charged with 410 parts of the polyester resins (a1'-2) synthesized in Comparative Production Example 6, 90 parts of isophorone diisocyanate, and 500 parts of ethyl acetate, which were then allowed to react at 100° C. for 5 hours, and thus a modified polyester having substituents capable of reacting (a polymer capable of reacting with the above-mentioned active hydrogen-containing compound) was synthesized.

The resulting modified polyester having substituents capable of reacting had a free isocyanate content of 1.53%.

<Emulsification/Dispersion>

A reaction vessel was charged with 749 parts of the above-mentioned organic solvent phase, 115 parts of the above-mentioned modified polyester having substituents capable of reacting, and 2.9 parts of isophoronediamine (D1-3), which were then mixed for 1 minute at a rotation speed of 5,000 rpm using a homomixer (TK Homomixer MKII manufactured by Tokushu Kika Kogyo Co., Ltd.), and then 1200 parts of the above-mentioned water phase was added to the reaction vessel, followed by mixing with the homomixer at a rotation speed of 9,000 rpm at 25° C. for 3 minutes. Thereafter, the mixture was stirred with a stirrer for 20 minutes, and thus an emulsified slurry was prepared.

Subsequently, a reaction vessel equipped with a stirring rod and a thermometer was charged with the emulsified slurry and then the solvent was removed at 25° C. After the removal of the organic solvent, maturing was performed at 45° C. for 15 hours, and thus a dispersed slurry was obtained.

The resulting dispersed slurry had a volume average particle diameter D50 of 4 μm as measured with a Multisizer III (manufactured by Beckman Coulter).

<Washing Step>

After vacuum filtering 100 parts of the above-mentioned dispersion slurry, 100 parts of ion-exchanged water was added to the filter cake and mixed with a homomixer (at a rotation speed of 8,000 rpm for 10 minutes), followed by filtration. To the resulting filter cake was added 100 parts of ion-exchanged water, which was then mixed with a homomixer (at a rotation speed of 8,000 rpm for 10 minutes), followed by vacuum filtration. To the resulting filter cake was added 100 parts of a 10% aqueous sodium hydroxide solution, which was then mixed with a homomixer (at a rotation speed of 8,000 rpm for 10 minutes), followed by filtration. To the resulting filter cake was added 100 parts of 10% hydrochloric acid, which was then mixed with a homomixer (at a rotation speed of 8,000 rpm for 10 minutes), followed by filtration.

The operation of adding 300 parts of ion-exchanged water to the resulting filter cake, then mixing with a homomixer (at a rotation speed of 8,000 rpm for 10 minutes), and then filtering was repeated twice, and thus a final filter cake was obtained.

The resulting final filter cake was dried at 45° C. for 48 hours in an air circulation dryer. As a result, there was obtained a resin particle (C'-3) containing the linear polyester resin (B'-2) and the non-linear polyester resin (A'-3) produced by reacting a modified polyester of the polyester resin (a1'-2) with isophoronediamine (D1-3).

<Comparative Example 4> <Production of Toner Binder (C'-4)>

Using the polyester resin (a1'-3) of Comparative Production Example 7 as a non-linear polyester resin, 50 parts of (a1'-3) and 50 parts of the linear polyester resins (B'-3) obtained in Comparative Production Example 3 were mixed using a Henschel mixer [FM10B manufactured by Mitsui Miike Chemical Engineering Machinery, Co., Ltd.]. As a result, there was obtained a toner binder (C'-4) containing the non-linear polyester resin (a1'-3) and the linear polyester resin (B'-3).

Physical properties of the toner binders obtained in Examples 2 to 13 and Comparative Examples 1 to 4, the surfactant contents, physical properties of the THF-soluble components in the toner binders, and physical properties of the THF-insoluble components were evaluated in the same manner as Example 1 and are shown in Table 3.

TABLE 3

| | | | | Example 1 (C-1) | Example 2 (C-2) | Example 3 (C-3) | Example 4 (C-4) | Example 5 (C-5) | Example 6 (C-6) |
|---|---|---|---|---|---|---|---|---|---|
| Composition (parts by weight) | Non-linear polyester resin (A) | Modified non-linear polyester resin (A1) | Polyester resin (a1-1) | 9.7 | 14.5 | — | — | — | — |
| | | | DURANATE TPA-100 (D-1) | 3.4 | 5.1 | — | — | — | — |
| | | | CORONATE T-80 (D1-2) | — | — | — | — | — | — |
| | | Modified non-linear polyester resin (A2) | Polyester resin (a2-1) | — | — | 10.0 | 10.0 | — | — |
| | | | Polyester resin (a2-2) | — | — | — | — | 30.0 | — |
| | | | Polyester resin (a2-3) | — | — | — | — | — | 30.00 |
| | | | Polyester resin (a2-4) | — | — | — | — | — | — |
| | | | Polyester resin (a2-5) | — | — | — | — | — | — |
| | | | NYPER BW (D2-1) | — | — | 0.4 | 0.4 | — | — |
| | | | PERBUTYL Z (D2-2) | — | — | — | — | 2.0 | — |
| | | | PERBUTYL D (D2-3) | — | — | — | — | — | 1.0 |
| | | | PERBUTYL P (D2-4) | — | — | — | — | — | — |
| | | Modified non-linear polyester resin (A3) | Polyester resin (a2-5) | — | — | — | — | — | — |
| | | | Polyester resin (a2-6) | — | — | — | — | — | — |
| | | | Polyester resin (a2-7) | — | — | — | — | — | — |
| | | | Diethylene glycol divinyl ether (b-1) | — | — | — | — | — | — |
| | | | Styrene/butyl acrylate/ monobutyl maleate (b'-1) | — | — | — | — | — | — |
| | | | Polyester resin (a2'-1) | — | — | — | — | — | — |
| | | | Polyester resin (a1'-1) | — | — | — | — | — | — |
| | | | Polyester resin (a1'-2) | — | — | — | — | — | — |
| | | | Polyester resin (a1'-3) | — | — | — | — | — | — |
| | Liner polyester resin (B) | | Polyester resin (B-1) | 90.3 | 85.5 | — | 90.0 | — | — |
| | | | Polyester resin (B-2) | — | — | 90.0 | — | — | — |
| | | | Polyester resin (B-3) | — | — | — | — | 70.0 | — |
| | | | Polyester resin (B-4) | — | — | — | — | — | 70.0 |
| | | | Polyester resin (B-5) | — | — | — | — | — | — |
| | | | Polyester resin (B'-1) | — | — | — | — | — | — |
| | | | Polyester resin (B'-2) | — | — | — | — | — | — |
| | | | Polyester resin (B'-3) | — | — | — | — | — | — |
| Properties of toner binder | | | Tg (°C.) | 55 | 54 | 50 | 58 | 54 | 53 |
| | | | G'x150/G'x180 [Formula (5)] | 0.9 | 1.0 | 8.6 | 9.4 | 0.9 | 1.1 |
| | | | G'x150/G'y150 [Formula (2)] | 3,526 | 1,327 | 506 | 550 | 1,980 | 1,745 |
| | | | Amount of surfactant (ppm) | Not detected | Not detected | Not detected | Not detected | Not detected | Not detected |
| | | | Hydroxy value (KOHmg/g) | 0.3 | 0.2 | 22 | 3.5 | 38 | 9 |
| | | | Tmx − Tmy (°C.) [Formula (4)] | 128 | 120 | 101 | 100 | 107 | 89 |
| Property of THF-insoluble component | | | % by weight | 9 | 14 | 15 | 1 | 30 | 22 |
| | | | G'x60 [Formula (8)] | 3,250,000 | 4,810,000 | 46,200,000 | 48,500,000 | 3,423,900 | 189,860 |
| | | | G"x150/G'x150 [Formula (6)] | 0.14 | 0.14 | 0.11 | 0.10 | 0.10 | 0.11 |
| | | | G'x150 [Formula (1)] | 67,000 | 73,000 | 33,400 | 33,000 | 29,700 | 34,900 |
| | | | G"x150 | 9,300 | 10,500 | 3,570 | 3,400 | 3,100 | 3,700 |
| | | | G'x180 | 74,800 | 72,900 | 3,900 | 3,500 | 32,000 | 33,000 |
| | | | Tmx (°C.) [Formula (3)] | 230 | 225 | 205 | 200 | 204 | 186 |
| Property of THF-soluble component | | | % by weight | 91 | 86 | 85 | 99 | 70 | 78 |
| | | | G'y150 | 19 | 55 | 66 | 60 | 15 | 20 |
| | | | G"y120/G'y120 [Formula (7)] | 7 | 9 | 11 | 13 | 16 | 15 |
| | | | Tmy (°C.) | 102 | 105 | 104 | 100 | 97 | 97 |
| | | | Mw | 20,450 | 37,000 | 124,000 | 35,000 | 8,000 | 9,700 |
| | | | Mn | 2,350 | 2,400 | 4,000 | 3,000 | 1,800 | 2,200 |
| | | | Mw/Mn | 8.7 | 15 | 31 | 12 | 4 | 4 |

| | | | | Example 7 (C-7) | Example 8 (C-8) | Example 9 (C-9) | Example 10 (C-10) | Example 11 (C-11) | Example 12 (C-12) |
|---|---|---|---|---|---|---|---|---|---|
| Composition (parts by weight) | Non-linear polyester resin (A) | Modified non-linear polyester resin (A1) | Polyester resin (a1-1) | — | — | — | — | — | — |
| | | | DURANATE TPA-100 (D-1) | — | — | — | — | — | — |
| | | | CORONATE T-80 (D1-2) | — | — | — | — | — | — |
| | | Modified non-linear polyester resin (A2) | Polyester resin (a2-1) | — | — | — | — | — | — |
| | | | Polyester resin (a2-2) | — | — | — | — | — | — |
| | | | Polyester resin (a2-3) | — | — | — | — | — | — |
| | | | Polyester resin (a2-4) | 20.0 | — | — | — | — | — |
| | | | Polyester resin (a2-5) | — | — | — | — | 30.0 | 25.0 |
| | | | NYPER BW (D2-1) | — | — | — | — | — | — |
| | | | PERBUTYL Z (D2-2) | — | — | — | 1.0 | 1.0 | 1.0 |
| | | | PERBUTYL D (D2-3) | 1.0 | 1.0 | — | — | — | — |
| | | | PERBUTYL P (D2-4) | — | — | 1.0 | — | — | — |

TABLE 3-continued

| | | | | | | | | |
|---|---|---|---|---|---|---|---|---|
| | Modified non-linear polyester resin (A3) | Polyester resin (a2-5) | — | 30.0 | — | — | — | — |
| | | Polyester resin (a2-6) | — | — | 20.0 | — | — | — |
| | | Polyester resin (a2-7) | — | — | — | 25.0 | — | — |
| | | Diethylene glycol divinyl ether (b-1) | — | 1.0 | 2.0 | 1.0 | — | — |
| | | Styrene/butyl acrylate/ monobutyl maleate (b'-1) | — | — | — | — | — | — |
| | | Polyester resin (a2'-1) | — | — | — | — | — | — |
| | | Polyester resin (a1'-1) | — | — | — | — | — | — |
| | | Polyester resin (a1'-2) | — | — | — | — | — | — |
| | | Polyester resin (a1'-3) | — | — | — | — | — | — |
| Liner polyester resin (B) | | Polyester resin (B-1) | — | — | — | — | — | — |
| | | Polyester resin (B-2) | — | — | — | — | — | — |
| | | Polyester resin (B-3) | — | — | — | — | — | — |
| | | Polyester resin (B-4) | — | 70.0 | — | 75.0 | 70.0 | — |
| | | Polyester resin (B-5) | 80.0 | — | 80.0 | — | — | 75.0 |
| | | Polyester resin (B'-1) | — | — | — | — | — | — |
| | | Polyester resin (B'-2) | — | — | — | — | — | — |
| | | Polyester resin (B'-3) | — | — | — | — | — | — |
| Properties of toner binder | | Tg (°C.) | 50 | 55 | 50 | 61 | 55 | 58 |
| | | G'x150/G'x180 [Formula (5)] | 1.1 | 1.1 | 1.4 | 1.1 | 1.1 | 1.2 |
| | | G'x150/G'y150 [Formula (2)] | 4,000 | 1,472 | 4,154 | 1,805 | 1,440 | 1,850 |
| | | Amount of surfactant (ppm) | Not detected | Not detected | Not detected | Not detected | Not detected | Not detected |
| | | Hydroxy value (KOHmg/g) | 42 | 13 | 44 | 8 | 13 | 44 |
| | | Tmx − Tmy (°C.) [Formula (4)] | 62 | 82 | 57 | 101 | 105 | 101 |
| Property of THF-insoluble component | | % by weight | 29 | 21 | 33 | 15 | 20 | 19 |
| | | G'x60 [Formula (8)] | 47,430 | 969,680 | 44,616 | 44,548,000 | 1,055,600 | 1,022,000 |
| | | G"x150/G'x150 [Formula (6)] | 0.12 | 0.11 | 0.11 | 0.10 | 0.11 | 0.12 |
| | | G'x150 [Formula (1)] | 52,000 | 36,800 | 54,000 | 39,700 | 36,000 | 37,000 |
| | | G"x150 | 6,100 | 3,900 | 5,800 | 4,000 | 4,100 | 4,300 |
| | | G'x180 | 48,000 | 32,500 | 40,000 | 35,000 | 33,000 | 30,000 |
| | | Tmx (°C.) [Formula (3)] | 160 | 180 | 155 | 200 | 202 | 201 |
| Property of THF-soluble component | | % by weight | 71 | 79 | 67 | 85 | 80 | 81 |
| | | G'y150 | 13 | 25 | 13 | 22 | 25 | 20 |
| | | G"y120/G'y120 [Formula (7)] | 16 | 13 | 17 | 12 | 13 | 10 |
| | | Tmy (°C.) | 98 | 98 | 98 | 99 | 97 | 100 |
| | | Mw | 8,100 | 10,400 | 7,500 | 13,000 | 13,600 | 12,000 |
| | | Mn | 2,300 | 3,000 | 2,600 | 2,300 | 3,000 | 2,800 |
| | | Mw/Mn | 4 | 3 | 3 | 6 | 5 | 4 |

| | Toner binder | | Example 13 (C-13) | Comparative Example 1 (C'-1) | Comparative Example 2 (C'-2) | Comparative Example 3 (C'-3) | Comparative Example 4 (C'-4) |
|---|---|---|---|---|---|---|---|
| Composition (parts by weight) | Non-linear polyester resin (A) | Modified non-linear polyester resin (A1) | | | | | |
| | | Polyester resin (a1-1) | — | — | — | — | — |
| | | DURANATE TPA-100 (D-1) | — | — | — | — | — |
| | | CORONATE T-80 (D1-2) | — | — | 3.4 | — | — |
| | Modified non-linear polyester resin (A2) | Polyester resin (a2-1) | — | — | — | — | — |
| | | Polyester resin (a2-2) | — | — | — | — | — |
| | | Polyester resin (a2-3) | — | — | — | — | — |
| | | Polyester resin (a2-4) | — | — | — | — | — |
| | | Polyester resin (a2-5) | 30.0 | — | — | — | — |
| | | NYPER BW (D2-1) | — | 0.4 | — | — | — |
| | | PERBUTYL Z (D2-2) | 1.0 | — | — | — | — |
| | | PERBUTYL D (D2-3) | — | — | — | — | — |
| | | PERBUTYL P (D2-4) | — | — | — | — | — |
| | Modified non-linear polyester resin (A3) | Polyester resin (a2-5) | — | — | — | — | — |
| | | Polyester resin (a2-6) | — | — | — | — | — |
| | | Polyester resin (a2-7) | — | — | — | — | — |
| | | Diethylene glycol divinyl ether (b-1) | — | — | — | — | — |
| | | Styrene/butyl acrylate/ monobutyl maleate (b'-1) | 5.0 | — | — | — | — |
| | | Polyester resin (a2'-1) | — | 5.0 | — | — | — |
| | | Polyester resin (a1'-1) | — | — | 40.0 | — | — |
| | | Polyester resin (a1'-2) | — | — | — | 13.9 | — |
| | | Polyester resin (a1'-3) | — | — | — | — | 50.0 |
| Liner polyester resin (B) | | Polyester resin (B-1) | — | — | — | — | — |
| | | Polyester resin (B-2) | — | 95.0 | — | — | — |
| | | Polyester resin (B-3) | — | — | — | — | — |
| | | Polyester resin (B-4) | — | — | — | — | — |
| | | Polyester resin (B-5) | 70.0 | — | — | — | — |
| | | Polyester resin (B'-1) | — | — | 60.0 | — | — |
| | | Polyester resin (B'-2) | — | — | — | 86.1 | — |
| | | Polyester resin (B'-3) | — | — | — | — | 50.0 |

TABLE 3-continued

| | | | | | | |
|---|---|---|---|---|---|---|
| Properties of toner binder | Tg(° C.) | 55 | 52 | 56 | 50 | 62 |
| | G'x150/G'x180 [Formula (5)] | 1.3 | 10 | 1.2 | 1.1 | 1.4 |
| | G'x150/G'y150 [Formula (2)] | 1,172 | 341 | 136 | 506 | 30 |
| | Amount of surfactant (ppm) | Not detected | Not detected | Not detected | 2,000 | Not detected |
| | Hydroxy value (KOHmg/g) | 44 | 20 | 21 | 18 | 40 |
| | Tmx − Tmy (° C.) [Formula (4)] | 102 | 75 | 77 | 100 | 49 |
| Property of THF-insoluble component | % by weight | 18 | 14 | 35 | 16 | 10 |
| | G'x60 [Formula (8)] | 1,508,700 | 121,000,000 | 139,000,000 | 412,000,000 | 77,900,000 |
| | G''x150/G'x150 [Formula (6)] | 0.14 | 0.29 | 0.15 | 0.13 | 0.22 |
| | G'x150 [Formula (1)] | 29,300 | 28,000 | 61,000 | 86,000 | 12,000 |
| | G''x150 | 4,000 | 8,100 | 9,200 | 11,000 | 2,600 |
| | G'x180 | 22,700 | 2,700 | 49,000 | 75,000 | 8,400 |
| | Tmx (° C.) [Formula (3)] | 204 | 195 | 220 | 221 | 173 |
| Property of THF-soluble component | % by weight | 82 | 86 | 65 | 84 | 90 |
| | G'y150 | 25 | 82 | 450 | 170 | 400 |
| | G''y120/G'y120 [Formula (7)] | 8 | 10 | 5 | 9 | 2 |
| | Tmy(° C.) | 102 | 120 | 143 | 121 | 124 |
| | Mw | 11,200 | 209,000 | 77,000 | 35,000 | 100,000 |
| | Mn | 2,500 | 4,100 | 3,900 | 3,600 | 2,600 |
| | Mw/Mn | 4 | 51 | 20 | 10 | 38 |

<Example 14> <Preparation of Toner (T-1)>

To 85 parts of the toner binder (C-1) obtained in Example 1 was added 6 parts of carbon black MA-100 [manufactured by Mitsubishi Chemical Corporation], 4 parts of carnauba wax, and 4 parts of a charge control agent T-77 [manufactured by Hodogaya Chemical Co., Ltd.] were added, and a toner was produced by the following method. First, the mixture was preliminarily mixed with a Henschel mixer (FM10B, manufactured by Mitsui Miike Chemical Plant Service Inc.) and then kneaded with a twin screw extruder (PCM-30, manufactured by Ikegai Co., Ltd.). Next, after being finely pulverized with a supersonic jet pulverizer Labo Jet [manufactured by Nippon Pneumatic Mfg. Co., Ltd.], the resulting particles were classified with an airflow classifier [MDS-1, manufactured by Nippon Pneumatic Mfg. Co., Ltd.], so that toner particles having a volume average particle diameter D50 of 8 μm were obtained.

Subsequently, 1 part of colloidal silica ("Aerosil R972" manufactured by Nippon Aerosil Co., Ltd.) was mixed with 100 parts of the toner particles with a sample mill, affording a toner (T-1) of the present invention.
[Methods for Evaluating Performance of Toner]

In the following, the methods for measuring and the methods for evaluating the low-temperature fixing property, glossiness, hot offset resistance, flowability, heat resistant storage property, electrostatic stability, grindability, image strength, folding resistance, and document offset property of the resulting toner are described together with their judgment criteria. The results were shown in Table 4.
<Low-Temperature Fixing Property>

A toner is placed on a paper uniformly to 0.85 mg/cm². In the method of placing the powder on the paper is used a printer from which a heat fixing mechanism has been removed. Other methods can be employed if a powder can thereby be placed uniformly in the above-mentioned weight density.

The temperature (MFT) at which cold offset occurred when the resultant paper was caused to pass through a compression roller at a fixing rate (compression roller circumferential rate) of 213 mm/sec and a fixing pressure (compression roller pressure) of 10 kg/cm² was measured.

A lower temperature at which cold offset occurred means that low temperature fixing property is better.

Generally, a temperature of 130° C. or lower is considered as being preferable under this evaluation condition.

<Glossiness>

Fixing evaluation is performed in the same manner as the low-temperature fixing property. Then, thick white paper was placed under an image, and the degree (%) of gloss of the printed image was measured at an incident angle of 60 degrees using a glossmeter ("IG-330" manufactured by Horiba, Ltd.). A higher gloss value means that the sample is superior in glossiness.

Generally, 5% or more is considered as being preferable under this evaluation condition.
<Hot Offset Resistance (Hot Offset Occurrence Temperature)>

Fixing evaluation was performed using the same device and method as those for the low-temperature fixing property, and the presence or absence of hot offset on a fixed image was visually evaluated.

The temperature at which hot offset occurred after the paper passed between the pressure rollers was regarded as the hot offset resistance (° C.).

Generally, 160° C. or more is considered as being preferable under this evaluation condition.
<Flowability>

The bulk density (g/100 mL) of the toner was measured by a powder tester manufactured by Hosokawa Micron Corporation, and the flowability was evaluated according to the following criteria.
[Criteria]
○: 33 or more
Δ: 25 or more and less than 33
x: Less than 25
<Heat Resistant Storage Property>

The toner was left to stand in an atmosphere of 50° C. for 24 hours. The degree of blocking was visually observed, and the heat resistant storage property was evaluated according to the following criteria.
[Criteria]
○: No blocking occurred.
Δ: Blocking partly occurred.
x: Blocking wholly occurred.
<Electrostatic Stability>

(1) The toner (0.5 g) and ferrite carrier (F-150 available from Powdertech Co., Ltd.) (20 g) were placed in a 50-mL glass jar. The temperature and the relative humidity inside the glass jar were controlled at 23° C. and 50% for at least 8 hours.

(2) The glass jar was friction-stirred at 50 rpm for 20 minutes and for 60 minutes by a tumbler shaker-mixer. The amount of electrostatic charge was measured for each time period.

A blow-off electrostatic charge meter (manufactured by Toshiba Chemical Corporation) was used for the measurement.

A value of "(Amount of electrostatic charge after 60 minutes of friction)/(Amount of electrostatic charge after 10 minutes of friction)" was calculated, and the value was regarded as an index of electrostatic stability.

[Criteria]
○: 0.7 or more
Δ: 0.6 or more and less than 0.7
x: Less than 0.6

<Grindability>

A coarsely pulverized material (having passed through a 8.6 mesh sieve, but having remained on a 30 mesh sieve) kneaded with a twin screw kneader and cooled was finely pulverized using a supersonic jet mill LABO JET (manufactured by Nippon Pneumatic Mfg. Co., Ltd.) under the following conditions.

Pulverization pressure: 0.5 MPa
Pulverization time: 10 minutes
Adjuster ring: 15 mm
Louver size: medium Without classification, the particles were measured for the volume average particle size (μm) with a Coulter counter "TAII" (manufactured by U.S. Coulter Electronics Ltd.). The grindability was evaluated according to the following criteria.

[Criteria]
○: less than 10 μm
Δ: 10 μm or more and less than 12 μm
x: 12 μm or more <Image Strength>

The image fixed in the evaluation of the low-temperature fixing property was subjected to a scratch test under a load of 10 g applied to a pencil fixed at a tilt of 45 degrees from directly above the pencil according to JIS K 5600. The image strength was evaluated based on the hardness of the pencil that did not scratch the image. Higher pencil hardness indicates better image strength.

[Criteria]
○: H or higher
Δ: B to F
X: 2B or lower

<Folding Resistance>

The image fixed in the evaluation of the low-temperature fixing property is folded with the image-fixed surface facing inward, and the paper is rubbed back and forth twice under a load of 30 g.

The paper was unfolded and visually observed for the presence or absence of a white line formed on the image by folding.

[Criteria]
○: No white lines are observed.
Δ: A few white lines are observed.
x: White lines are observed.

<Document Offset Property>

Two sheets of the A4 paper with a fixed image obtained by the evaluation of the low-temperature fixing property are stacked with the fixed images facing each other, and are left to stand at 60° C. under a load of 420 g (0.68 g/cm$^2$) for 60 minutes.

The document offset resistance was evaluated based on the following criteria from the condition when the stacked sheets of the paper were separated from each other.

[Criteria]
○: No resistance.
Δ: A crunchy sound is heard, but the image is not peeled off from the paper.
x: The image is peeled off from the paper.

The content of the surfactant in the toner binder in the toner of Example 14 of the present invention was measured by the same method as that of Example 1. When the surfactant content was 5 ppm or less, this was reported as "not detected." The results were shown in Table 4.

<Examples 15 to 26> <Preparation of Toners (T-2) to (T-13)>

Toners were produced in the same manner as Example 14 with reference to Table 4 with respect to the composition of raw materials, and thus toners (T-2) to (T-13) were obtained. Subsequently, evaluation was performed in the same manner as in Example 14 and the results are shown in Table 4.

<Comparative Examples 5 to 7> <Preparation of Toners (T'-1) to (T"-3)>

Toners were produced in the same manner as Example 14 with reference to Table 4 with respect to the composition of raw materials, and thus toners for comparison (T'-1) to (T'-3) were obtained. Subsequently, evaluation was performed in the same manner as in Example 14 and the results are shown in Table 4.

<Comparative Example 8> <Preparation of Toner (T"-4)>

<Preparation of Particulate Dispersion Liquid 1>

[Particulate dispersion liquid 1] was obtained by the same method as that of Comparative Example 3. The [particulate dispersion liquid 1] had a volume average particle diameter of 105 nm as measured with LA-920. A portion of the [particulate dispersion liquid 1] was dried and a resin material was thereby isolated. The resin material in the dispersion liquid had a Tg of 59° C. and a weight average molecular weight of 150,000.

<Preparation of Water Phase>

A milk white liquid (water phase) was obtained by the same method as that of Comparative Example 3.

<Preparation of Masterbatch (MB)>

Water (1200 parts), 540 parts of carbon black ("Printex 35"; manufactured by Degussa Co., Ltd., DBP oil absorption amount=42 ml/100 mg, pH=9.5) as a pigment, and 1200 parts of the linear polyester resin (B'-2) synthesized in Comparative Production Example 2 were mixed with a Henschel mixer (manufactured by Mitsui Mining Co., Ltd.). The mixture was kneaded with a twin-roll mill at 150° C. for 30 minutes, then cold-rolled and pulverized with a pulverizer (manufactured by Hosokawa Micron Corporation), and thus a masterbatch was prepared.

<Synthesis of Modified Polyester Having Substituent Groups Capable of Reacting>

A modified polyester having a substituent group capable of reacting (a polymer capable of reacting with the above-mentioned active hydrogen group-containing compound) was synthesized by the same method as that of Comparative Example 3.

The resulting modified polyester having substituent groups capable of reacting had a free isocyanate content of 1.53%.

<Preparation of Organic Solvent Phase>

A reaction vessel equipped with a stirring rod and a thermometer was charged with 378 parts of the linear polyester resin (B'-2) synthesized in Comparative Production Example 2, 110 parts of paraffin wax (HNP-11 manufactured by Nippon Seiro Co., Ltd.), and 947 parts of ethyl acetate, which were then heated to 80° C. under stirring and held at 80° C. for 30 hours and then cooled to 30° C. over 1 hour. Thus, a raw material solution was obtained.

Then, 1324 parts of the resulting raw material solution was transferred to the reaction vessel and was dispersed using a bead mill ("ULTRAVISCO MILL" manufactured by AIMEX Co., Ltd.) for 9 hr under the conditions: liquid feeding speed: 1 kg/hr; disc circumferential velocity: 6 m/sec; and the amount of 0.5-mm zirconia beads filled: 80% by volume, and thus a wax dispersion liquid was obtained.

Subsequently, 1324 parts of a 65% ethyl acetate solution of the linear polyester (B'-2) synthesized in Comparative Production Example 2 was added to the resulting wax dispersion liquid, and 500 parts of the above-mentioned masterbatches and 500 parts of ethyl acetate were charged and mixed for 1 hour. Subsequently, while keeping the temperature of the mixed liquid at 25° C., the mixed liquid was passed through Ebara Milder (a combination of G, M, and S from the inlet side) at a flow rate of 1 kg/min four times to prepare an organic solvent phase (pigment and wax dispersion).

The solid concentration of the resulting organic solvent phase (130° C., 30 minutes) was 50%.

<Emulsification/Dispersion>

A reaction vessel was charged with 749 parts of the above-mentioned organic solvent phase, 115 parts of the above-mentioned modified polyester having substituent groups capable of reacting, and 2.9 parts of isophoronediamine (D1-3), which were then mixed for 1 minute at a rotation speed of 5,000 rpm using a homomixer (TK Homomixer MKII manufactured by Tokushu Kika Kogyo Co., Ltd.), and then 1200 parts of the above-mentioned water phase was added to the reaction vessel, followed by mixing with the homomixer at a rotation speed of 9,000 rpm at 25° C. for 3 minutes. Thereafter, the mixture was stirred with a stirrer for 20 minutes, and thus an emulsified slurry was prepared.

Subsequently, a reaction vessel equipped with a stirring rod and a thermometer was charged with the emulsified slurry and then the solvent was removed at 25° C. After the removal of the organic solvent, maturing was performed at 45° C. for 15 hours, and thus a dispersed slurry was obtained.

The resulting dispersed slurry had a volume average particle diameter D50 of 5 μm as measured with a Multisizer III (manufactured by Beckman Coulter).

<Washing Step>

After vacuum filtering 1000 parts of the above-mentioned dispersion slurry, 1000 parts of ion-exchanged water was added to the filter cake and mixed with a homomixer (at a rotation speed of 8,000 rpm for 10 minutes), followed by filtration. To the resulting filter cake was added 1000 parts of ion-exchanged water, which was then mixed with a homomixer (at a rotation speed of 8,000 rpm for 10 minutes), followed by vacuum filtration. To the resulting filter cake was added 1000 parts of a 10% aqueous sodium hydroxide solution, which was then mixed with a homomixer (at a rotation speed of 8,000 rpm for 10 minutes), followed by filtration. To the resulting filter cake was added 1000 parts of 10% hydrochloric acid, which was then mixed with a homomixer (at a rotation speed of 8,000 rpm for 10 minutes), followed by filtration. The operation of adding 3000 parts of ion-exchanged water to the resulting filter cake, then mixing with a homomixer (at a rotation speed of 8,000 rpm for 10 minutes), and then filtering was repeated twice, and thus a final filter cake was obtained. The resulting filter cake was dried at 45° C. for 48 hours in an air circulation dryer and then screened with a mesh having 75-μm openings, and thus toner particles were obtained.

<Compounding of Fluidizer>

Using a sample mill, 1 part of colloidal silica ("Aerosil R972" manufactured by Nippon Aerosil Co., Ltd.) was mixed with 100 parts of the toner particles obtained, affording a toner for comparison (T'-4). Subsequently, evaluation was performed in the same manner as in Example 14 and the results are shown in Table 4. Since a pulverization step was not performed for the toner (T'-4) of Comparative Example 8, evaluation of grindability was omitted.

TABLE 4

| | Toner | | Example 14 (T-1) | Example 15 (T-2) | Example 16 (T-3) | Example 17 (T-4) | Example 18 (T-5) | Example 19 (T-6) | Example 20 (T-7) | Example 21 (T-8) | Example 22 (T-9) | Example 23 (T-10) |
|---|---|---|---|---|---|---|---|---|---|---|---|---|
| Formulation of toner (parts by weight) | Toner binder © | (C-1) | 85 | — | — | — | — | — | — | — | — | — |
| | | (C-2) | — | 85 | — | — | — | — | — | — | — | — |
| | | (C-3) | — | — | 85 | — | — | — | — | — | — | — |
| | | (C-4) | — | — | — | 85 | — | — | — | — | — | — |
| | | (C-5) | — | — | — | — | 85 | — | — | — | — | — |
| | | (C-6) | — | — | — | — | — | 85 | — | — | — | — |
| | | (C-7) | — | — | — | — | — | — | 85 | — | — | — |
| | | (C-8) | — | — | — | — | — | — | — | 85 | — | — |
| | | (C-9) | — | — | — | — | — | — | — | — | 85 | — |
| | | (C-10) | — | — | — | — | — | — | — | — | — | 85 |
| | | (C-11) | — | — | — | — | — | — | — | — | — | — |
| | | (C-12) | — | — | — | — | — | — | — | — | — | — |
| | | (C-13) | — | — | — | — | — | — | — | — | — | — |
| | | (C'-1) | — | — | — | — | — | — | — | — | — | — |
| | | (C'-2) | — | — | — | — | — | — | — | — | — | — |
| | | (C'-3) | — | — | — | — | — | — | — | — | — | — |
| | | (C'-4) | — | — | — | — | — | — | — | — | — | — |

TABLE 4-continued

|  |  |  |  |  |  |  |  |  |  |  |  |
|---|---|---|---|---|---|---|---|---|---|---|---|
|  | Pigment | Carbon black MA-100 | 6 | 6 | 6 | 6 | 6 | 6 | 6 | 6 | 6 | 6 |
|  | Charge control agent | T-77 | 4 | 4 | 4 | 4 | 4 | 4 | 4 | 4 | 4 | 4 |
|  | Wax | Carnauba wax | 4 | 4 | 4 | 4 | 4 | 4 | 4 | 4 | 4 | 4 |
|  | Fluidizer | Aerosil R972 | 1 | 1 | 1 | 1 | 1 | 1 | 1 | 1 | 1 | 1 |
| Analysis of toner Performance | Amount of surfactant (ppm) | | Not detected | Not detected | Not detected | Not detected | Not detected | Not detected | Not detected | Not detected | Not detected | Not detected |
|  | Low-temperature fixing property (° C.) | | 125 | 125 | 130 | 125 | 120 | 115 | 110 | 115 | 110 | 120 |
|  | Glossiness | | 15 | 14 | 7 | 8 | 10 | 12 | 20 | 17 | 15 | 19 |
|  | Hot offset resistance (° C.) | | 170 | 200 | 170 | 165 | 200 | 190 | 180 | 180 | 185 | 185 |
|  | Flowability | | ○ | ○ | ○ | ○ | ○ | ○ | ○ | ○ | ○ | ○ |
|  | Heat resistant storage property | | ○ | ○ | ○ | ○ | ○ | ○ | ○ | ○ | ○ | ○ |
|  | Electrostatic stability | | ○ | ○ | ○ | ○ | ○ | ○ | ○ | ○ | ○ | ○ |
|  | Grindability | | ○ | ○ | ○ | ○ | ○ | ○ | ○ | ○ | ○ | ○ |
|  | Image strength | | ○ | ○ | ○ | ○ | ○ | ○ | ○ | ○ | ○ | ○ |
|  | Folding resistance | | ○ | ○ | ○ | ○ | ○ | ○ | ○ | ○ | ○ | ○ |
|  | Document offset property | | ○ | ○ | ○ | ○ | ○ | ○ | ○ | ○ | ○ | ○ |

| Toner | | | Example 24 (T-11) | Example 25 (T-12) | Example 2 (T-13) | Comparative Example 5 (T'-1) | Comparative Example 6 (T'-2) | Comparative Example 7 (T'-3) | Comparative Example 8 (T'-4) |
|---|---|---|---|---|---|---|---|---|---|
| Formulation of toner (parts by weight) | Toner binder | (C-1) | — | — | — | — | — | — | Details are described in preparation of toner (T'-4) in description. |
|  |  | (C-2) | — | — | — | — | — | — | |
|  |  | (C-3) | — | — | — | — | — | — | |
|  |  | (C-4) | — | — | — | — | — | — | |
|  |  | (C-5) | — | — | — | — | — | — | |
|  |  | (C-6) | — | — | — | — | — | — | |
|  |  | (C-7) | — | — | — | — | — | — | |
|  |  | (C-8) | — | — | — | — | — | — | |
|  |  | (C-9) | — | — | — | — | — | — | |
|  |  | (C-10) | — | — | — | — | — | — | |
|  |  | (C-11) | 85 | — | — | — | — | — | |
|  |  | (C-12) | — | 85 | — | — | — | — | |
|  |  | (C-13) | — | — | 85 | — | — | — | |
|  |  | (C'-1) | — | — | — | 85 | — | — | |
|  |  | (C'-2) | — | — | — | — | 85 | — | |
|  |  | (C'-3) | — | — | — | — | — | — | |
|  |  | (C'-4) | — | — | — | — | — | 85 | |
| | Pigment | Carbon black MA-100 | 6 | 6 | 6 | 6 | 6 | 6 | |
| | Charge control agent | T-77 | 4 | 4 | 4 | 4 | 4 | 4 | |
| | Wax | Carnauba wax | 4 | 4 | 4 | 4 | 4 | 4 | |
| | Fluidizer | Aerosil R972 | 1 | 1 | 1 | 1 | 1 | 1 | |
| Analysis of toner Performance | Amount of surfactant (ppm) | | Not detected | Not detected | Not detected | Not detected | Not detected | Not detected | 2,300 |
| | Low-temperature fixing property (° C.) | | 115 | 110 | 115 | 135 | 140 | 150 | 130 |
| | Glossiness | | 19 | 14 | 14 | 5 | 3 | 3 | 6 |
| | Hot offset resistance (° C.) | | 185 | 190 | 180 | 150 | 200 | 190 | 200 |
| | Flowability | | ○ | ○ | ○ | Δ | Δ | ○ | ○ |
| | Heat resistant storage property | | ○ | ○ | ○ | ○ | ○ | ○ | Δ |
| | Electrostatic stability | | ○ | ○ | ○ | Δ | Δ | ○ | X |
| | Grindability | | ○ | ○ | ○ | Δ | X | ○ | Not evaluated |
| | Image strength | | ○ | ○ | ○ | X | ○ | X | ○ |
| | Folding resistance | | ○ | ○ | ○ | Δ | ○ | X | Δ |
| | Document offset property | | ○ | ○ | ○ | Δ | ○ | ○ | Δ |

As apparent from the evaluation results given in Table 4, the toners of the present invention of Examples 14 to 26 were excellent in all the performance evaluations.

On the other hand, the toners of Comparative Examples 5 to 7, which do not satisfy Formula (2), and the toner of Comparative Example 8, which has a surfactant content of greater than 100 ppm, were poor in some performance evaluations.

INDUSTRIAL APPLICABILITY

The toner binder and the toner of the present invention simultaneously improve low-temperature fixing property, glossiness and hot offset resistance, and are superior in flowability, heat resistant storage property, electrostatic stability, grindability, image strength, folding resistance, and document offset property of a toner, and therefore can suitably be used as a toner and a toner binder for electrostatic image development to be used for electrophotography, electrostatic recording, electrostatic printing, etc. Moreover, they can suitably be used for such applications as additives for paint, additives for adhesive, and particles for electronic paper.

The invention claimed is:

1. A toner binder comprising a polyester resin, wherein the toner binder satisfies Formula (1) and Formula (2) given below and has a content of a surfactant of 100 ppm or less, $$G'_{x150} \geq 10{,}000 \qquad (1)$$

$$G'_{x150}/G'_{y150} \geq 500 \qquad (2)$$

wherein $G'_{x150}$ represents the storage modulus (unit: Pa) at 150° C. for the tetrahydrofuran (THF)-insoluble component of the toner binder and $G'_{y150}$ represents the storage modulus (unit: Pa) at 150° C. of the THF-soluble component of the toner binder, wherein the polyester resin comprises a non-linear polyester resin (A) and a and a linear polyester resin (B), and wherein the non-linear polyester resin (A) is either:
(i) a modified non-linear polyester resin (A1) produced by reacting a polyester resin (a1) having an active hydrogen on a terminal of the main chain with an extender (D) wherein the extender (D) is a radical reaction initiator (D2),
(ii) a modified non-linear polyester resin (A2) prepared by chemically bonding a polyester resin (a2) prepared from an alcohol component (y) and an unsaturated carboxylic acid component (z) with a carbon-carbon linkage between resin molecules by a radical addition reaction under the existence of a radical reaction initiator (D2), or
(iii) a modified non-linear polyester resin (A3) prepared by chemically bonding a polyester resin (a2) prepared from an alcohol component (y) and an unsaturated carboxylic acid component (z) with a compound (b) having a radical reactive group and having a number average molecular weight of 1,000 or less by a radical addition reaction under the existence of a radical reaction initiator (D2).

2. The toner binder according to claim 1, wherein the toner binder satisfies Formula (3) and Formula (4) given below:

$$140 \leq Tm_x \leq 250 \qquad (3)$$

$$Tm_x - Tm_y \geq 55 \qquad (4)$$

wherein $Tm_x$ represents the softening point (° C.) of the THF-insoluble component of the toner binder determined with a flow tester and $Tm_y$ represents the softening point (° C.) of the THF-soluble component of the toner binder determined with a flow tester.

3. The toner binder according to 1, the chart of which measured by differential scanning calorimetry (DSC) has only one inflection point that represents a glass transition temperature within a temperature range of −20° C. to 80° C.

4. The toner binder according to claim 1, wherein the toner binder satisfies Formula (5) given below:

$$G'_{x150}/G'_{x180} \leq 10 \qquad (5)$$

wherein $G'_{x150}$ represents the storage modulus (unit: Pa) at 150° C. for the tetrahydrofuran (THF)-insoluble component of the toner binder and $G'_{x180}$ represents the storage modulus (unit: Pa) at 180° C. for the THF-insoluble component of the toner binder.

5. The toner binder according to claim 1, wherein the toner binder satisfies Formula (6) and Formula (7) given below:

$$G''_{x150}/G'_{x150} \geq 0.1 \qquad (6)$$

$$G''_{y120}/G'_{y120} \leq 20 \qquad (7)$$

wherein $G''_{x150}$ represents the loss modulus (unit: Pa) at 150° C. for the THF-insoluble component of the toner binder, $G''_{y120}$ represents the loss modulus (unit: Pa) at 120° C. of the THF-soluble component of the toner binder, $G'_{x150}$ represents the storage modulus (unit: Pa) at 150° C. for the THF-insoluble component of the toner binder, and $G'_{y120}$ represents the storage modulus (unit: Pa) at 120° C. of the THF-soluble component of the toner binder.

6. The toner binder according to claim 1, wherein the weight ratios (A)/(B) of the non-linear polyester resin (A) to the linear polyester resin (B) is 1/99 to 55/45.

7. The toner binder according to claim 1, wherein the toner binder has a hydroxy value of 0 to 45 KOHmg/g.

8. The toner binder according to claim 1, wherein the weight ratio of the THF-insoluble component to the THF-soluble component of the toner binder is 1/99 to 41/59.

9. The toner binder according to claim 1, wherein the weight average molecular weight Mw of the THF-soluble component of the toner binder is 4,000 to 120,000, the ratio Mw/Mn of Mw to the number average molecular weight Mn is 3 to 30.

10. The toner binder according to claim 1, wherein the hydroxy value of the linear polyester resin (B) is 0 to 5 KOHmg/g.

11. The toner binder according to claim 1, wherein the non-linear polyester resin (A) is a modified non-linear polyester resin (A1) produced by reacting a polyester resin (a1) having an active hydrogen on a terminal of the main chain with an extender (D).

12. The toner binder according to claim 1, wherein the non-linear polyester resin (A) contains the THF-insoluble component in a content of 50% by weight or more.

13. A toner comprising the toner binder according to claim 1 and a colorant.

* * * * *